(12) United States Patent
Ali et al.

(10) Patent No.: US 10,101,870 B2
(45) Date of Patent: Oct. 16, 2018

(54) CUSTOMIZING PROGRAM FEATURES ON A PER-USER BASIS

(71) Applicant: Microsoft Technology Licensing, LLC, Redmond, WA (US)

(72) Inventors: Zohaib Haider Ali, Everett, WA (US); David Lloyd Meyers, Jr., Seattle, WA (US); Jun Yan, Seattle, WA (US); Craig Edward Thomas, Redmond, WA (US); Srinivasa Reddy Manda, Sammamish, WA (US); Sara Louise Manning Dawson, Bellevue, WA (US); Kevin C. Clement, Redmond, WA (US); Samuele Carpineti, Redmond, WA (US); Ankit Goel, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 405 days.

(21) Appl. No.: 14/885,313

(22) Filed: Oct. 16, 2015

(65) Prior Publication Data
US 2017/0108995 A1   Apr. 20, 2017

(51) Int. Cl.
G06F 9/44 (2018.01)
G06F 3/0481 (2013.01)
(Continued)

(52) U.S. Cl.
CPC .......... *G06F 3/0481* (2013.01); *G06F 3/0484* (2013.01); *G06F 8/65* (2013.01);
(Continued)

(58) Field of Classification Search
CPC ........ G06F 3/0481; G06F 3/0484; G06F 8/65; G06F 8/70; G06F 8/71; G06F 8/73;
(Continued)

(56) References Cited

U.S. PATENT DOCUMENTS 5,999,908 A    12/1999  Abelow
6,324,693 B1 * 11/2001  Brodersen ................. G06F 8/65
                                                     707/999.202
(Continued)

OTHER PUBLICATIONS

Magy Seif El-Nasr, "Game Analytics for Game User Research, Part 1: A Workshop Review and Case Study", 2013, pp. 6-11, [Retrieved from Internet on Jan. 16, 2018], <http://ieeexplore.ieee.org/stamp/stamp.jsp?tp=&arnumber=6482531>.*

(Continued)

*Primary Examiner* — Ziaul A Chowdhury
(74) *Attorney, Agent, or Firm* — Rainier Patents, P.S.

(57) ABSTRACT

A computer-implemented technique is described herein for customizing user experience on a per-user basis. In some implementations, the technique involves: collecting feedback information from a user pertaining to the user's interaction with a program feature; determining a modification to be made to the program feature based on the feedback information; making the modification; notifying the user of the modification; and receiving the user's post-modification assessment of the modification. The technique enables a program provider to quickly modify program features in an automated manner, with no (or reduced) effort by human developers, and at consequent reduced cost. In addition, the technique improves the users' experience with the program features since the program modifications are tailored to each user's preferences.

18 Claims, 13 Drawing Sheets

(51) Int. Cl.
*G06F 17/27* (2006.01)
*G06F 3/0484* (2013.01)
*G06N 99/00* (2010.01)
*H04L 12/58* (2006.01)
*G06F 8/65* (2018.01)
*G06F 8/70* (2018.01)
*G06F 8/71* (2018.01)
*G06F 8/73* (2018.01)
*G06F 11/34* (2006.01)

(52) U.S. Cl.
CPC .............. *G06F 8/70* (2013.01); *G06F 8/71* (2013.01); *G06F 8/73* (2013.01); *G06F 11/3438* (2013.01); *G06F 17/27* (2013.01); *G06N 99/005* (2013.01); *H04L 51/32* (2013.01)

(58) Field of Classification Search
CPC ... G06F 11/3438; G06F 17/27; G06N 99/005; H04L 51/32
See application file for complete search history.

(56) References Cited

U.S. PATENT DOCUMENTS

| | | | |
|---|---|---|---|
| 7,055,094 B2 | 5/2006 | Imielinski et al. | |
| 8,055,602 B2 | 11/2011 | Tirpak et al. | |
| 8,359,237 B2 | 1/2013 | Dalal et al. | |
| 8,380,635 B2 | 2/2013 | Ding et al. | |
| 8,776,028 B1 | 7/2014 | Enakiev et al. | |
| 8,832,191 B1* | 9/2014 | Lebeau | H04L 51/10 382/209 |
| 8,904,345 B2 | 12/2014 | Dalal et al. | |
| 2003/0040361 A1* | 2/2003 | Thorner | G06F 3/011 463/36 |
| 2003/0085927 A1* | 5/2003 | Muller | G06F 3/0481 715/810 |
| 2003/0200356 A1* | 10/2003 | Hue | G06F 8/71 719/322 |
| 2004/0032340 A1* | 2/2004 | Lingafeldt | H04M 11/002 340/870.02 |
| 2005/0283398 A1 | 12/2005 | Hintikka et al. | |
| 2006/0117311 A1* | 6/2006 | Demuth | G06F 8/70 717/168 |
| 2009/0292584 A1* | 11/2009 | Dalal | G06Q 30/02 705/7.29 |
| 2009/0307161 A1* | 12/2009 | Dalal | G06N 99/005 706/12 |
| 2009/0319462 A1* | 12/2009 | Tirpak | G06F 9/4443 706/47 |
| 2010/0037166 A1* | 2/2010 | Chandrasekar | G06F 3/0481 715/769 |
| 2010/0082516 A1 | 4/2010 | Basu et al. | |
| 2011/0295787 A1* | 12/2011 | Tateno | G06F 17/27 706/46 |
| 2012/0182205 A1* | 7/2012 | Gamst | G06F 3/0484 345/7 |
| 2012/0327100 A1* | 12/2012 | Shih | G06F 3/041 345/589 |
| 2013/0074051 A1* | 3/2013 | Freeman | G06F 11/3438 717/130 |
| 2013/0159228 A1* | 6/2013 | Meijer | G06F 9/4443 706/14 |
| 2013/0191304 A1 | 7/2013 | Gaucas et al. | |
| 2013/0332918 A1* | 12/2013 | Aoyagi | G06F 8/65 717/172 |
| 2014/0071134 A1 | 3/2014 | Mass et al. | |
| 2014/0089913 A1* | 3/2014 | Aaronson | G06F 8/61 717/174 |
| 2014/0226677 A1 | 8/2014 | Mendes et al. | |
| 2014/0229912 A1* | 8/2014 | Furtado | G06F 8/20 717/120 |
| 2015/0052503 A1* | 2/2015 | Ligman | G06F 11/3664 717/125 |
| 2015/0363090 A1* | 12/2015 | Sarangdhar | G06F 3/0481 715/762 |
| 2016/0266724 A1* | 9/2016 | Plumb-Larrick | G06F 3/0481 |
| 2016/0335252 A1* | 11/2016 | Brunet | G06F 17/2785 |
| 2017/0017353 A1* | 1/2017 | Holzer | G06F 3/0481 |

OTHER PUBLICATIONS

Puri, Kumar Sumith, "The Feedback Based Software Development Process," in Proceedings of the National Conference on Software Engineering, held at Cochin University of Science and Technology in association with CSI Cochin Chapter, Aug. 2013, 6 pages.
Peham, Thomas, "How We Implement New Product Features Backed by Customer Feedback!," available at <<http://usersnap.com/blog/how-we-implement-new-product-features-backed-by-customer-feedback/>>, UserSnap Blog, retrieved on Sep. 8, 2015, 4 pages.
"Custom Product Input," available at <<https://shopplugin.net/docs/the-catalog/custom-product-input/>>, Shopp, Ingenesis Limited, retrieved on Aug. 5, 2015, 3 pages.
Broekens, et al., "Affectbutton: Towards a Standard for Dynamic Affective User Feedback," in Proceedings of the 3rd International Conference on Affective Computing and Intelligent Interaction and Workshops, Sep. 2009, 8 pages.
Chapter II PCT Demand and response filed Feb. 13, 2017 from PCT Patent Application No. PCT/US2016/055237, 21 pages.
International Preliminary Report on Patentability dated Jul. 7, 2017 from PCT Patent Application No. PCT/US2016/055237, 8 pages.
International Search Report and Written Opinion dated Dec. 23, 2016 from PCT Patent Application No. PCT/US2016/055237, 14 pages.
Panichella et al., "How Can I Improve My App? Classifying User Reviews for Software Maintenance and Evolution", Proceedings of the IEEE International Conference on Software Maintenance and Evolution (ICSME), Sep. 29, 2015, 10 pages.
Carreno et al., "Analysis of User Comments: An Approach for Software Requirements Evolution", Proceedings of the IEEE 35th International Conference on Software Engineering (ICSE), May 18, 2013, 10 pages.
Seyff et al., "AppEcho: A User-Driven, In Situ Feedback Approach for Mobile Platforms and Applications", Proceedings of the ACM 1st International Conference on Mobile Software Engineering and Systems, Jun. 2, 2014, 10 pages.

* cited by examiner

USER FEEDBACK PROFILE FOR JOHN B. SMITH, ID NO. 40350

USER DATA:
- CHARACTERISTICS OF THE USER
- ETC.

PROGRAM COMPONENT 34536

FEEDBACK INFORMATION:
- FROM USER-INITIATED COMMENTS WHILE USING THE PROGRAM
- FROM SURVEY RESPONSES
- FROM PUBLIC FORUM POSTINGS
- FROM AUTOMATED DETECTION MECHANISMS (GESTURE, VOICE, FACIAL EXPRESSION, ETC.)
- ETC.

TELEMETRY INFORMATION:
- PERTAINING TO FEATURES OF THE USER'S ENVIRONMENT
- PERTAINING TO PROGRAM COMPONENT CONFIGURATION
- PERTAINING TO PROGRAM COMPONENT BEHAVIOR
- PERTAINING TO USER BEHAVIOR IN INTERACTING WITH THE PROGRAM COMPONENT
- ETC.

PROGRAM COMPONENT 78460

FEEDBACK INFORMATION
- 
- 
-

CUSTOMIZING PROGRAM FEATURES ON A PER-USER BASIS

BACKGROUND

A software developer typically updates its software products on a periodic and/or event driven basis. The developer may produce an update by first manually identifying existing problems with a software product. The developer may then manually develop one or more fixes for the identified problems, optionally together with one or more new program features. Finally, the developer pushes the same fixes and features out to all users who are qualified to receive the update.

SUMMARY

A computer-implemented technique is described herein for customizing a user experience for each user. The technique involves receiving feedback information from the user. The feedback information provides an assessment by the user of a program feature. That assessment may be expressed, at least in part, by at least one comment by the user. The technique then stores the feedback information in a user feedback profile associated with the user.

Next, the technique determines a modification to be made to the program feature based on the user feedback profile associated with the user. In one implementation, the determining operation can include automatically interpreting the user's comment(s) based on the linguistic content of those comment(s). Next, the technique makes the identified modification to the program feature, to produce a modified program feature. The modified program feature produces a modified user experience when the user interacts with the modified program feature.

In some implementations, the technique also notifies the user of the modification that has been (or will be) made to the program feature. In some implementations, the technique presents the notification in the context of the user's interaction with the program feature that has been changed.

In some implementations, the technique also entails receiving post-modification assessment information from the user. The post-modification assessment information provides the user's assessment of the modified program feature.

As will be elaborated on herein, the technique enables a software provider to quickly modify program features in an automated manner, with no (or reduced) effort by human developers. This expedites the delivery of program features and reduces the cost of doing so. In addition, the technique modifies the program features on a per-user basis, which overall improves the users' level of satisfaction with the program features.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 shows an example of a user feedback profile maintained by the environment of FIG. 1 for a particular hypothetical user.

Figure 1:
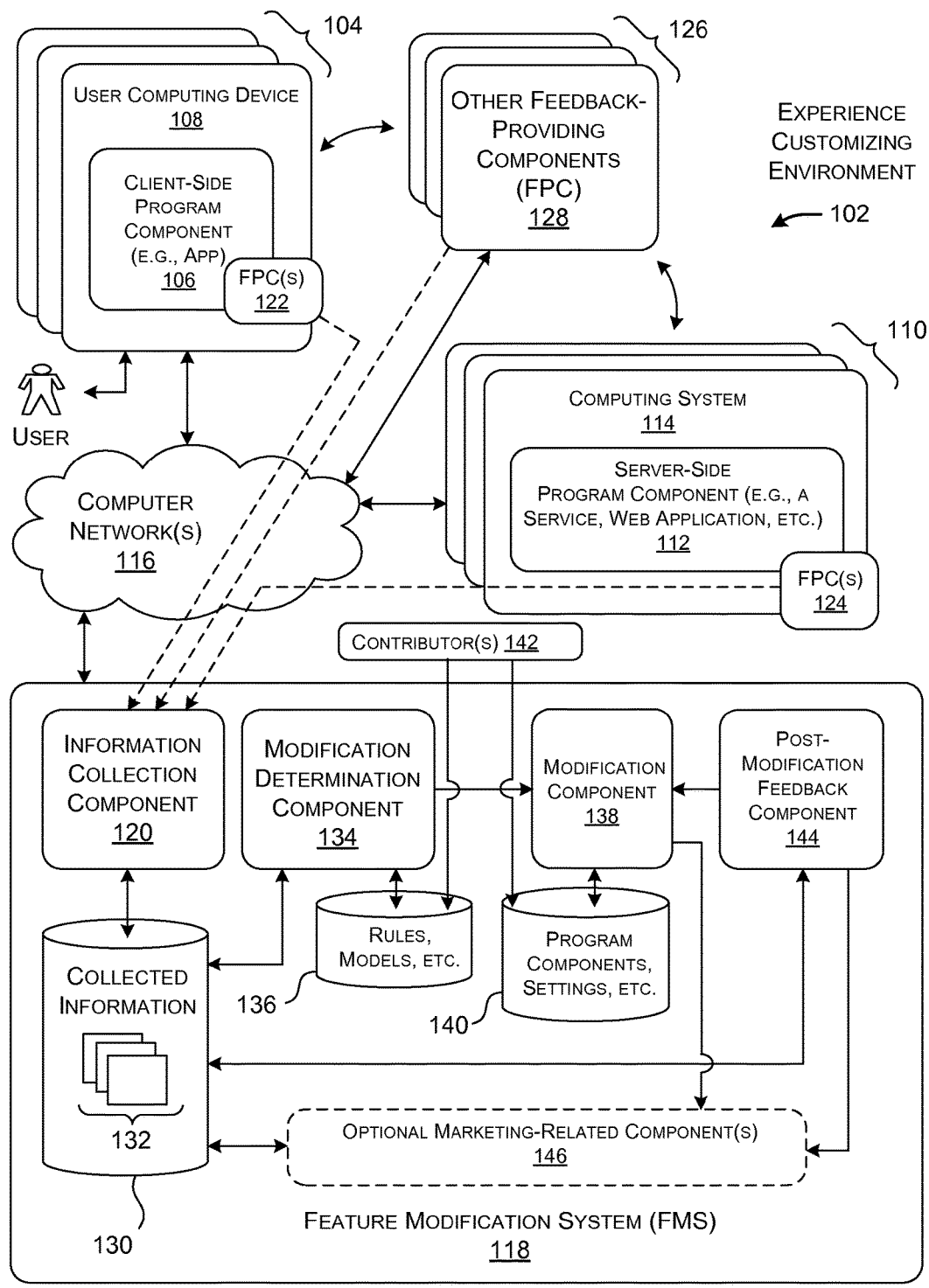
FIG. 1 shows an overview of an environment for modifying program features on a per-user basis based on feedback information provided by the users.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for customizing program features on a per-user basis based on feedback information provided by the users. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. The various components shown in the figures can be implemented, for instance, by software running on computer equipment, hardware (e.g., chip-implemented logic functionality), etc., or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented, for instance, by software running on computer equipment, hardware (e.g., chip-implemented logic functionality), etc., or any combination thereof.

As to terminology, the phrase "configured to" encompasses various ways that physical and tangible functionality can be constructed to perform an identified operation. The functionality can be configured to perform an operation using, for instance, software running on computer equipment, hardware (e.g., chip-implemented logic functionality), etc., or any combination thereof.

The term "logic" encompasses various physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., or any combination thereof. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

FIG. 1 shows an environment 102 for customizing program features on a per-user basis based on feedback information provided by the respective users. To simplify the explanation, FIG. 1 only shows a single user who interacts with the program features. But the environment 102 may include any number of users.

A program feature corresponds to some aspect of the operation of a program component. A program component, in turn, corresponds to any computer-implemented mechanism that performs one or more functions. For example, one type of program component corresponds to an Email application that is dedicated to creating, sending, receiving, and organizing electronic mail messages (Email). One program feature of the Email application corresponds to its sign-out experience. The sign-out experience corresponds to the experience that is provided to the user when he or she signs out of the Email application.

In some cases, a program component may correspond to a software program that performs one or more functions. The software program corresponds to a collection of machine-readable instructions stored in a machine-readable storage medium. A computing device performs one or more functions associated with the software program when a hardware processor executes the machine-readable instructions. In other cases, the program component corresponds to one or more functions implemented by hardware logic, such as one or more Field-Programmable Gate Array (FPGA) devices, and so on. In still other cases, the program component corresponds to some combination of machine-readable instructions and discrete hardware logic.

In some cases, a program feature corresponds to a feature that is unique to a particular program component. For example, a program feature may provide a particular file-picking experience that is found in only one kind of program component. In other cases, a program feature corresponds to a feature that is found in two or more program components. For example, a program feature may provide a sign-out experience that is found in a family of program components that is produced by a software developer. The program components in the family may perform different respective functions. Alternatively, or in addition, the family of program components may include different versions of the same program functionality. For example, one version may correspond to a client-side program component that is designed to run on a first kind of operating system, while another version may correspond to a client-side program component that is designed to operate on an operating system of another type.

The representative user shown in FIG. 1 may interact with program components via one or more user computing devices 104. For instance, FIG. 1 shows that the user may interact with a client-side program component 106 which is locally provided by a user computing device 108. For instance, the client-side program component 106 may correspond to a local application which the user has downloaded from an online marketplace. Generally, the user computing devices 104 may correspond to any computing mechanisms, such as, without limitation, any of: a desktop personal computing device; a laptop computing device; a set-top box device, a game console device; a tablet-type computing device; a smartphone or other type of wireless telephone; a wearable computing device, and so on.

In addition, the user, via the user computing device 108, may interact with program components provided by one or more remote computing systems 110. For instance, FIG. 1 shows that the user may interact with a server-side program component 112 which is remotely provided by a computing system 114. For instance, the program component 112 may correspond to a remote service (e.g., a cloud computing service), a web application, etc. The computing system 114 may be implemented by one or more server computing devices, in optional conjunction with other computing equipment (e.g., load balancers, routers, etc.).

In still other cases, the user may interact, via the user computing device 108, with a program component that is implemented in a distributed fashion. For example, the user may interact with a program component that is implemented in distributed fashion by the user computing device 108 and the computing system 114. Yet other implementations of program components are possible.

One or more computer networks 116 (referred to, for convenience, in the singular below) couple all of the separate devices in the environment 102 together. The computer network 116 can include a wide area network (e.g., the Internet), a local area network, one or more point-to-point communication links, and so on, or any combination thereof.

A feature modification system (FMS) 118 represents a central engine which receives and analyzes the user's feedback, and which makes changes to at least one program feature based on the user's feedback. In one implementation, the FMS 118 is implemented by one or more server computing devices (and other computing equipment, such as load balancers, routers, etc.). In other cases, the environment 102 may distribute the functions of the FMS 118 over two or more components in the environment 102. For example, one or more functions of the FMS 118 can be performed in local fashion by each user computing device.

The FMS 118 includes a set of components that perform different respective tasks. To begin with, an information collection component 120 collects user-related information that pertains to the user's interaction with different program components. In some cases, the information collection component 120 can use a push technique to receive the user-related information. In this technique, the agent which provides the user-related information forwards that information without being requested to do so by the information collection component 120. In other cases, the information collection component 120 can use a pull technique to receive the user-related information. In that technique, the agent which provides the user-related information provides the information upon the instruction of the information collection component 120. As clarified in Section C, the environment 102 allows users to choose when to participate in the data collection provisions of the FMS 118, and then when to cease participating in the data collection provisions. The FMS 118 also maintains appropriate safeguards to protect any user-related information that it collects, such as encryption mechanisms, etc.

The user-related information may include user data, feedback information, telemetry information, and so on. The user data may describe characteristics of each user who interacts with the program components. For instance, the user data may describe the demographic characteristics of each user. In one case, the information collection component 120 can receive the user data via one or more pre-existing accounts associated with the user. One or more data stores provided anywhere in the environment 102 provide the pre-existing user accounts. In another case, the user may explicitly provide the user data to the information collection component 120, e.g., in a setup procedure or the like.

The feedback information expresses a user's assessment of a program feature. In some cases, the user may provide the feedback information by making one or more linguistic comments that express the user's opinion of the program feature. Often, the comments constitute complaints, although they may sometimes include praise. For example, consider a user who is unhappy with an Email application because it provides a review pane which reveals a text-bearing snippet of each Email message that has been received. The user may be upset with this program feature because the user believes that it compromises his or her privacy, e.g., based on the concern that passersby in his or her work environment can see the review pane and the messages presented therein. The user may therefore register a linguistic complaint such as, "I hate this Email reveal feature because it compromises my privacy."

The user may express a linguistic-based complaint in any form using any input device of combination of input devices. For example, the user can generate a text-based complaint by using any input device(s) to type it into a free-form text input box provided by a user interface presentation. In addition, or alternatively, the user may create a text-based complaint by using any input device(s) to select a complaint from a menu of pre-generated complaints and/or by interacting with any other graphical control feature (e.g., radio buttons, slider bars, etc.). In addition, or alternatively, the user may create a linguistic complaint by speaking it. A voice recognition component can detect the user's vocalized complaint and convert it to text using known speech recognition technology.

In yet other cases, the user may provide feedback information in some form other than words or symbols. For example, the user may perform a gesture that is associated with exasperation. In addition, the user may make a facial expression or eye movement that is associated with displeasure, confusion, etc. A video camera and associated video recognition technology can detect these events. For example, the video recognition technology can compare the user's facial expression to one or more patterns associated with displeasure to determine if the user is expressing a complaint while interacting with a program component.

In other cases, the environment 102 may include various physiological capture devices to detect conditions that may indirectly have a bearing on user's state of mind. The physiological capture devices include haptic input devices (e.g., which capture electro-dermal input signals), breathing rate detection devices, blood pressure monitoring devices, heart rate monitoring devices, brain activity monitoring devices (e.g., an electroencephalogram), and so on.

The above examples of feedback information are cited by way of illustration, not limitation; other implementations of the information collection component 120 can collect and store other instances of feedback information. To facilitate explanation, the remainder of this disclosure will emphasize the case in which the user's feedback information constitutes a linguistic (e.g., a text-based) complaint. Again, however, the user can express his or her complaint in many different forms.

FIG. 1 shows that the information collection component 120 receives feedback information from one or more feedback-providing points (FPPs), e.g., on a push basis, pull basis, or combination thereof. As the terms are used herein, a feedback-providing point (FPP) refers to a particular source of feedback information, while a feedback-providing component (FPC) corresponds to the functional agent which collects the feedback information from the FFP. In some cases, a feedback-providing component may be located at the same site as the FFP with which it interacts; in other cases, a feedback-providing component may be located at a different site from the FFP with which it interacts.

Feedback-providing components can be implemented in different ways and can operate in different ways. For instance, FIG. 1 shows that the client-side program component 106 incorporates a feedback-providing component 122 that collects information from the client-side program component 106, which constitutes a FFP. In one implementation, the feedback-providing component 122 may correspond to a part of the program component 106 itself. That is, this feedback-providing component 122 can correspond to a body of machine-readable instructions associated with the program component 106 that, when executed, performs a complaint-collection function.

In one manner of operation, a user may activate the feedback-providing component 122 in the course of interacting with the program component 106, assuming that the feed-providing component 122 is not already activated. For instance, the user may activate the feedback-providing component 122 when he or she encounters a program feature with which he or she is dissatisfied. The user may activate the feedback-component 122 through any activation mechanism, e.g., by clicking on a command feature provided by a user interface presentation, speaking an activation command, and so on. Once the feedback-providing component 122 is activated, the user may then supply his or her feedback information through whatever interface mechanism is provided by the feedback-providing component 122 (e.g., via a free-form text input box or the like). The feedback-providing component 122 can then forward the user's feedback information to the information collection component 120.

Similarly, FIG. 1 shows that the server-side program component 112 incorporates a feedback-providing component 124. That feedback-providing component 124 may represent a part of the server-side program component 112, and may operate in a manner that is similar to the client-side feedback-providing component 122 described above.

FIG. 1 also shows other feedback-providing components 126 that are not directly integrated with any program component. For example, a feedback-providing component 128 may constitute a computer-implemented survey service or comment service. In one manner of operation, the survey service detects (based on telemetry information) when the user is interacting with a particular program component. Or the survey service may operate in a more fine-grained manner by detecting (based on telemetry information) when the user is interacting with a particular program feature associated with a program component. In response to this detection, the survey service can invite the user to respond to a product satisfaction survey or the like. Or the survey service can issue an open-ended invitation to the user to comment on a particular product feature or a product component as a whole. The survey service may collect the user's response to the survey and forward it to the information collection component 120.

In another case, a feedback-providing point can correspond to a computing system which hosts any shared forum in which users air grievances (and praise) with respect to one or more program features associated with one or more program components. For instance, the shared forum may take the form of a blog, social network service, product review site, product manufacture site, etc. In operation, the user may independently access such a site to make a comment regarding a computing program under consideration. For example, the user may visit a computing system which hosts a blog pertaining to an Email application. The user may then enter a comment that expresses his or her frustration with a particular feature of this program component. Or the user may contribute to a preexisting comment that already expresses some complaint with a program feature. More specifically, the user may contribute to a preexisting comment by providing his or her own text-based comment that is directed to the preexisting comment. In addition, or alternatively, the user may vote on another user's preexisting comment, indicating whether the user agrees or disagrees with that comment.

A feedback-providing component can interact with the above-described shared forum to extract any or all such comments logged there. In some implementations, the feedback-providing component may correspond to an agent associated with the shared forum itself. In that case, the feedback-providing component can forward the feedback information to the information collection component 120. In other cases, the feedback-providing component may be associated with the information collection component 120 or some other external agent (with respect to the shared forum). In that case, the feedback-providing component can interact with the shared forum through any access mechanism, such as an Application Programming Interface (API) provided by the shared forum for this purpose.

The above explanation has set forth examples of feedback-providing points and associated feedback-providing components in the spirit of illustration, not limitation. Other implementations can incorporate additional mechanisms for collecting feedback information and forwarding it to the information collection component 120.

The telemetry information describes any characteristic of the environment which impacts the user's ability to interact with a program component under consideration. For example, the telemetry information may describe the ways in which each user is able to interact with a program component. For instance, consider the case in which the program component under consideration is an Email application. The telemetry information may identify the versions of the Email application with which the user interacts (e.g., a locally stored version, a web application version, etc.). In addition, or alternatively, the telemetry information may describe the program features that are available to the user. For example, the user may interact with the Email application via a subscription of a certain type; that subscription may grant the user access to certain program features, but not others. In addition, or alternatively, the telemetry information may describe the manner in which the Email application has been configured by the user.

In addition, or alternatively, the telemetry information may describe the devices that the user uses to interact with a program component under consideration. For instance, the telemetry information may indicate that the user interacts with an Email application using a particular type of device (e.g., a tablet-type computing device), and that device uses a particular kind of operating system. In addition, or alternatively, the telemetry information may describe factors in the environment 102 which affect the user's ability to interact with a program component under consideration. For example, the telemetry information may describe the type of connection that the user is using to interact with the Internet.

In addition, or alternatively, the telemetry information can provide performance-related information pertaining to the environment 102 or some part(s) thereof. For example, the telemetry information may indicate whether the computer network 116 (or some part thereof) is currently experiencing congestion or some other degradation in performance that will likely affect the user's interaction with a program component under consideration. Alternatively, or in addition, the telemetry information may describe the performance of the program component under consideration. For example, the telemetry information may indicate whether the above-described Email application is malfunctioning, and how it is malfunctioning.

In addition, or alternatively, the telemetry information can describe the manner in which the user typically interacts with the program component under consideration. For example, the telemetry information can describe the frequencies at which the user interacts with certain program features of the program component. In addition, or alternatively, the telemetry information can describe the sequences of operations that the user typically performs when engaging the program component, and so on.

The above examples of telemetry information are cited by way of illustration, not limitation; other implementations can collect and store other instances of telemetry information.

Although not shown in FIG. 1, the environment 102 can provide the telemetry information through any telemetry-providing components (TPCs), associated with respective telemetry-providing points (TPPs). For example, the information collection component 120 can collect telemetry information by actively polling user computing devices and program components associated with the user, accounts maintained by the user, and so on. Through this mechanism, the information collection component 120 can determine the devices associated with the user, the program components and service options available to the user, the program configurations set by the user, and so on. The information collection component 120 can also actively poll other components in the environment 102, such as routers, etc. Through this mechanism, the information collection component 120 can determine the presence of network congestion, etc. In addition, or alternatively, any telemetry-providing components can independently forward telemetry information to the information collection component 120.

The information collection component 120 stores all of the user-related information that it collects for a user in a data store 130. More specifically, the information collection component 120 can store the user-related information for a particular person in a user feedback profile associated with that person. Collectively, the data store 130 provides a plurality user feedback profiles 132 associated with a plurality of respective users. Each user feedback profile corresponds to a data structure that captures a complete snapshot of the user's relationship to one or more program components and the program features associated therewith, including the user's assessment of those program features.

Jumping ahead in the sequence of figures, FIG. 2 show a user feedback profile 202 associated with a hypothetical user, John B. Smith. The user feedback profile 202 stores user-related information pertaining to this user's engagement with different program components. For each such component, the user feedback profile 202 can provide feedback information and telemetry information (and/or any other type of information that has been collected). The user feedback profile 202 can also provide user data that describes one or more characteristics pertaining to the user himself.

More specifically, in some cases, an instance of feedback information and/or telemetry information pertains to only a single program component. In that case, the information collection component 120 can store that information in a section of the user feedback profile that is associated with the particular program component. In other cases, the feedback information and/or telemetry information pertains to two or more program components. In that case, the information collection component 120 can store the information in those sections of the user feedback profile to which it pertains.

Returning to FIG. 1, the FMS 118 includes a modification determination component 134 for determining a modification to be made to a program feature for a user under consideration, such as the hypothetical John B. Smith of FIG. 2. The explanation below will set forth different ways in which the modification determination component 134 can determine the modification to be made. By way of introduction, in one implementation, the modification determination component 134 can determine at least one rule to be applied based on at least keyword information that appears in the user feedback profile associated with the user. The modification determination component 134 can also make its decision based on other information that has been collected, such as telemetry information. Each rule specifies a program modification to be made upon its invocation. In another implementation, the modification determination component 134 uses a machine-trained model to map the linguistic (and/or telemetry information) in the user feedback profile to an indication of a modification to be made. Generally, a data store 136 may provide rules and/or model parameters that enable the modification determination component 134 to perform the above operations.

A modification component 138 executes whatever modification(s) have been selected by the modification determination component 134. More specifically, the modification component 138 performs at least two functions. First, the modification component 138 deploys the modification that has been selected by the modification determination component 134, for a particular user. Second, the modification component 138 notifies the user that the modification has been made. However, in other implementation, the modification component 138 can notify the user of the modification before it is actually made.

The modification component 138 can make a modification in different ways. In one case, the modification component 138 changes one or more parameter values that control the operation of a program component under consideration. For example, the parameter value(s) may have the effect of turning certain already-existing program features on or off. The modification component 138 can change these parameter values wherever they happen to be stored. For example, in some cases, a central store provides parameter values for each user, with respect to each program component with which the user interacts. The modification component 138 can then change the appropriate values within that central store. Alternatively, or in addition, a local data store may maintain the parameter values that control its operation with respect to a particular user, and with respect to a particular program component. Here, the modification component 138 can change the appropriate values provided in that local store.

In yet other cases, the modification component 138 can send code updates to the program component (wherever it happens to be implemented). In some cases, a code update may change the operation of a preexisting program feature. In other cases, a code update may introduce a new program feature that did not previously exist in the program component.

A data store 140 stores program components, setting values, etc. which enables the modification component 138 to operate in the manner described above. For example, to execute a modification that involves adding a new program feature, the modification component 138 may retrieve associated program code and/or setting values in the data store 140 that implement (or at least turn on) the new program feature.

FIG. 1 also shows that one or more contributors 142 may interact with the FMS 118 to govern its operation. For example, an application developer, program manager, security engineer, etc. may add one or more new rules and/or models to the data store 136. The rules and models may affect the behavior of the modification determination component 134. Further, an application developer, program manager, security engineer, etc. may add program code, setting values, etc. to the data store 140. The program code and setting values affect the behavior of the modification component 138.

A post-modification feedback component 144 invites the user to enter his or her assessment of a modification that has been made to a program feature. The information collection component 120 may then receive new feedback information, which reflects the user's response to the post-modification feedback component's inquiry. The post-modification feedback component 144 can then take appropriate action based on the user's response. For example, if the user complains about the change (e.g., by giving it low score value), then the post-modification feedback component 144 can instruct the modification component 138 to remove the modification that has been made. This removal may constitute turning on or off a program feature (e.g., by changing an appropriate setting value), and/or sending new code to the affected program component.

Finally, one or more marketing-related components 146 (referred to in the singular below) can leverage the operation of the FMS 118 in various ways. For example, the marketing-related component 146 can detect the user's complaint, as well as the modification determination component's analysis of that complaint. In response, the marketing-related component 146 can invite the user to upgrade a program component under consideration to overcome whatever negative issue the user is experiencing. Doing so will improve the experience of the user and increase the revenue of whatever entity administers the FMS 118. In other words, the marketing-related component 146 can leverage the user's feedback information as an upsell opportunity.

Another marketing-related component 146 can detect the user's assessment of a modification that has been made by the modification component 138. If the user's level of satisfaction is considered high (based on some environment-specific threshold value), then the marketing-related program 146 can invite the user to post his or her comment to some shared forum, such as a social network site, a blog, a marketplace site, and so on. By virtue of this provision, the marketing-related component 146 can propagate the positive feedback of satisfied users, and, in so doing, potentially increase the sales of the program component under consideration.

Figure 3:
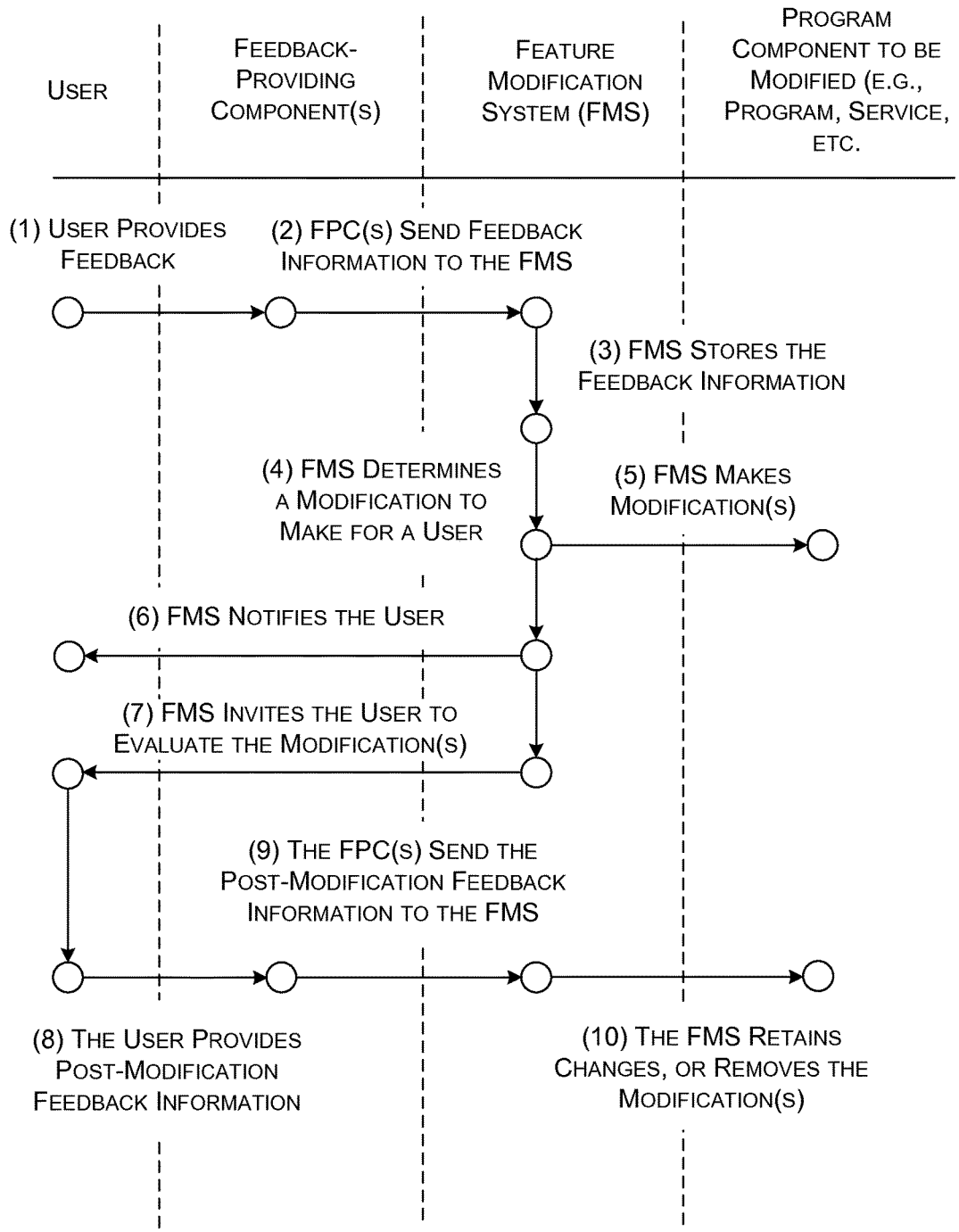
FIG. 3 shows one illustrative flow of operations that are performed in the environment of FIG. 1.

Advancing to FIG. 3, this figure shows one flow of operations that may be performed by the environment 102 of FIG. 1. This flow is described by way of example, not limitation. Other implementations can vary the described flow in one or more respects.

In operation (1), a user provides feedback information in any manner. For example, the user may type a text-based complaint into an input box provided by a user interface presentation in the course of interacting with a particular program feature. In operation (2), a feedback-providing component sends the user's feedback information to the information collection component 120 of the FMS 118. In operation (3), the information collection component 120 stores the feedback information in the data store 130, in a user feedback profile associated with the user. FIG. 3 does not describe the collection of telemetry information; however, the information collection component 120 can provide telemetry information to the FMS 118 in a similar manner to that described above.

In operation (4), the modification determination component 134 determines one or more modifications to be made based on the user feedback information (in optional conjunction with telemetry information). In operation (5), the modification component 138 makes the indicated modification(s). In operation (6), the modification component 138 notifies the user of the modification(s) that have been made. In other implementations, operation (6) may precede operation (5), or occur at the same time as operation (5).

In operation (7), the post-modification feedback component 144 invites the user to provide his or her assessment of the modification(s) that have been made. In operation (8), the user enters post-modification feedback information. In operation (9), a feedback-providing component sends the feedback information to the information collection component 120. In operation (10), the post-modification feedback component 144, in conjunction with the modification component 138, may optionally remove or change a program modification with which the user has expressed displeasure.

Figure 4:
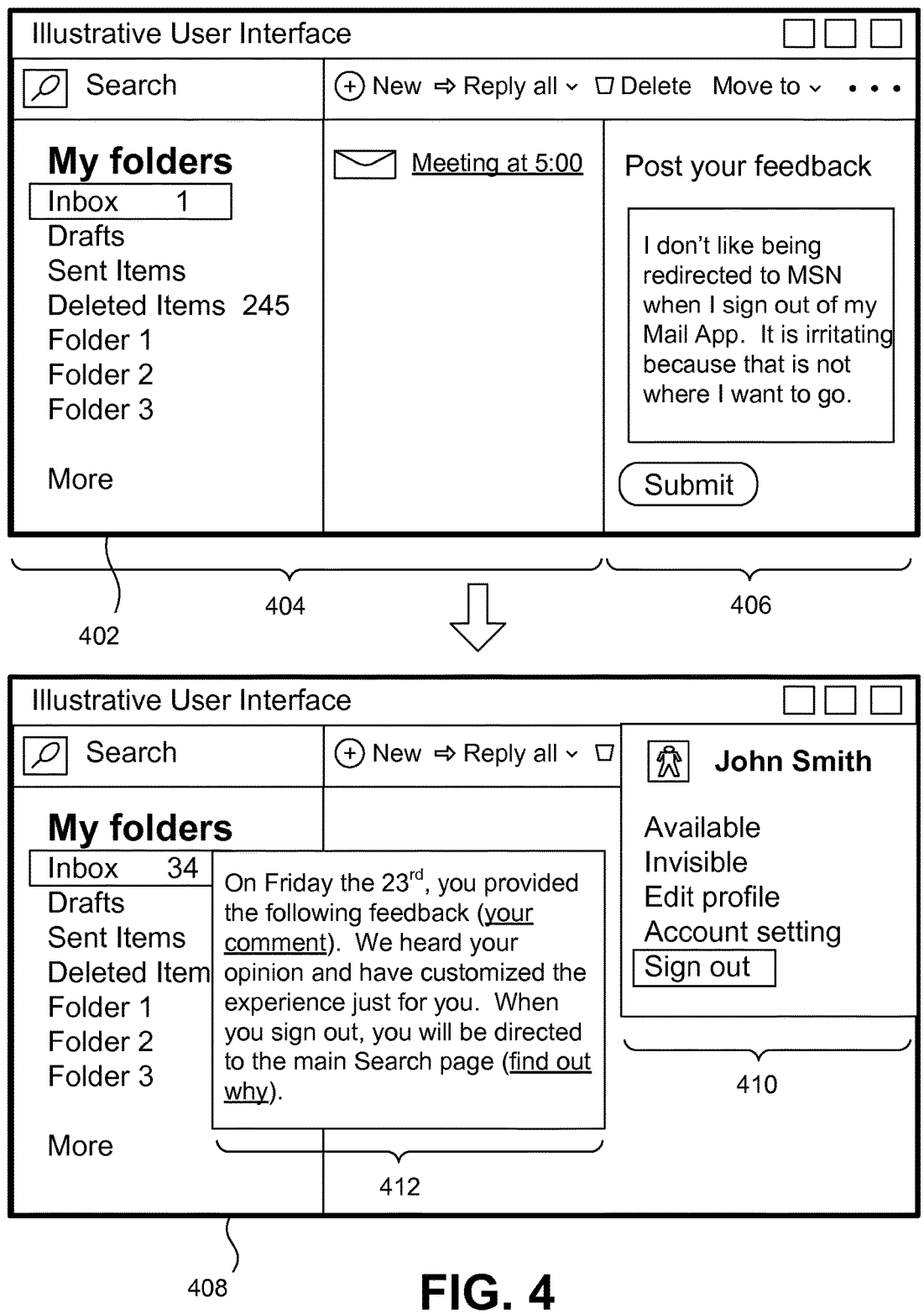
FIGS. 4 and 5 show a series of user interface presentations that may be presented by the environment of FIG. 1.
Figure 5:
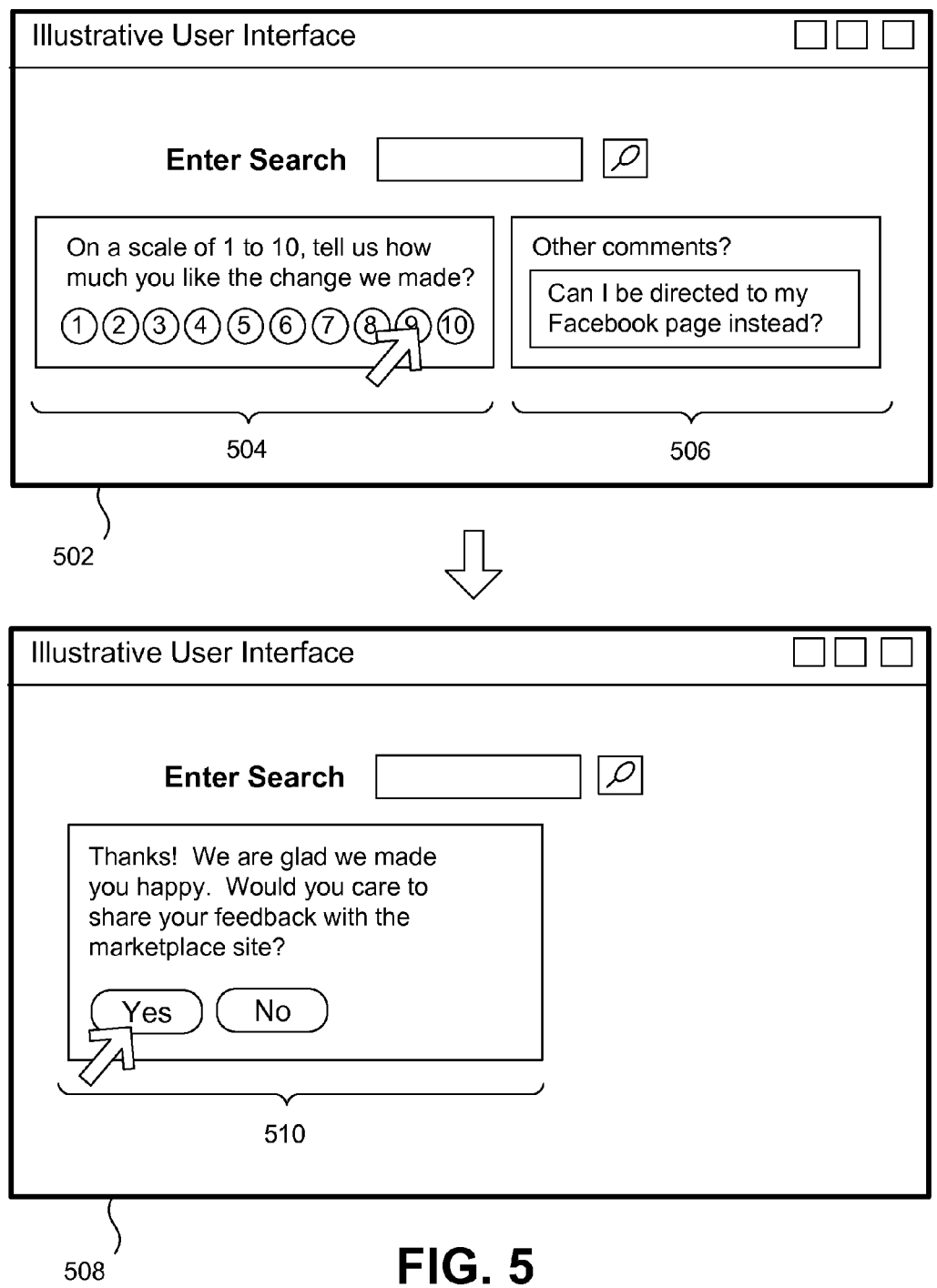

FIGS. 4 and 5 show a series of user interface presentations (or more generally, user interface mechanisms) that the environment 102 can present to a user in the course of the above-described operational flow. Assume, in this case, that the program component under consideration is an Email application, either implemented as a client application provided by the user computing device 108, or as a web application by the computing system 114 (with which the user interacts via a browser program that runs on the user computing device 108), etc., or some combination thereof. Regardless of where (and how) the code of the Email application runs, the user computing device 108 can be said to provide instances of logic for producing each of the features of the user interface mechanisms shown in FIGS. 4 and 5.

In a first user interface presentation 402 of FIG. 4, the Email application displays a portal 404 through which the user may create new Email messages, receive Email messages, organize Email messages, and so on. A comment service, once activated, displays a comment panel 406 which integrates with the user interface presentation 402. In one implementation, the comment service may correspond to a feedback-providing component that is an integral part of the Email application. In another implementation, the comment service may correspond to a feedback-providing component that is separate from the Email application. In the latter case, the comment service can detect the manner in which the user is interacting with the Email application, and then provide appropriate user interface features which integrate with the user interface presentation 402.

In the particular scenario of FIG. 4, the user specifies a comment through the comment panel 406 that reads, "I don't like being redirected to MSN when I sign out of Mail App. It is irritating because that is not where I want to go." In other words, the user is unhappy with the sign-out experience provided by the Email application. The Email application launches the user into a certain site (MSN) upon signing out of the Email application, but the user would prefer that the Email application would direct him or her to another site.

The information collection component 120 receives the user's complaint through any feedback channel described above. The modification determination component 134 analyzes the complaint, in optional conjunction with the telemetry information, to determine that a modification is warranted to the program feature which controls the sign-out experience. More specifically, the modification determination component 134 decides that it is appropriate to change the sign-out behavior of the Email application so that that the user is directed to his or her homepage, rather than the MSN site. The modification determination component 134 has knowledge of the user's homepage based on the telemetry information that has been collected.

Other telemetry information may indicate the version of the Email application with which the user is currently interacting, and whether the user interacts with the Email application through any other versions. The telemetry information can also indicate the device(s) and operating system(s) through which the user interacts with the Email application.

With respect to the bottom half of FIG. 4, now assume that the Email application provides a user interface presentation 408 to the user at some time after the above-described modification has been made. Further assume that, at this particular juncture, the user is in the process of signing out from the Email application. More specifically, the user has activated a control panel 410 and activated a sign-out option within that control panel 410. In response, the modification component 138 sends a notification message 412 to the user which notifies the user of the modification that has been made to the sign-out feature. In this case, the modification component 138 provides the notification message 412 via pop-up notification panel or the like. But the modification component 138 can use any other technique to provide the notification message 412, such as by sending an audio message, etc.

The notification message 412 reads, "On Friday the 23$^{rd}$, you provided the following feedback (your comment). We heard your opinion and have customized the experience just for you. When you sign out, you will be directed to the main Search page (find out why)." There are several aspects to note about this notification message 412. First, the modification component 138 presents the notification message 412 at the time at which the user engages the program feature that has been changed (namely, the sign-out feature of the Email application). The modification component 138 may also present the notification message 412 in spatial proximity to the program feature that has been changed, such as by presenting the notification message 412 near the control panel 410. In other words, the modification component 138 displays the notification message 412 at an appropriate temporal and spatial context. By doing so, the modification component 138 can help the user understand the change that has been made. Further, by presenting the notification message 412 in a context-sensitive manner, the modification component 138 reduces the risk that the user will be bombarded with many notification messages at the same time. Indeed, in those cases in which a user never interacts with a program feature that has been modified, the modification component 138 may potentially never need to alert the user that the program feature has been changed.

Second, the modification component 138 reveals information in the notification message 412 that allows the user to understand why the modification was made. For example, the notification message 412 provides a link to the user's complaint (or complaints) that initiated the modification. Further, the notification message 412 provides an explanation of why the user's homepage was chosen as a redirection site.

FIG. 5 shows a user interface presentation 502 that the user computing device 108 displays when the user finally signs out of the Email application. As indicated in the notification message 412 (of FIG. 4), the Email application has launched the user into the user's homepage, which, here, happens to be the introductory page of a search-related program. At this juncture, the post-modification feedback component 144 can present a message 504 that invites the user to evaluate how pleased or displeased the user is with the modification that has been made. In this case, the message 504 asks the user to rank the desirability of the change on a scale from 1 to 10. However, the post-modification feedback component 144 can solicit the user's feedback in any way. For example, alternatively, or in addition, the post-modification feedback component 144 can provide another message 506 which invites the user to enter his or her evaluation in the form of free-form text.

In another implementation, the post-modification feedback component 144 can invite the user to enter feedback information at the same time that it notifies the user of the change that has been made. For example, the post-modification feedback component 144 can present the message 504 shown in FIG. 5 beneath the notification message 412 shown in FIG. 4 (or anywhere else within that user interface presentation 408).

Assume that the user is satisfied with the change that has been made, and therefore provides relatively favorable feedback information (e.g., by ranking the change as "9" out of "10."). The marketing-related component 146 may detect this event. In response, in user interface presentation 508, the marketing-related component 146 can provide a message 510 which asks the user whether he or she wishes to post a positive comment to some shared forum. For example, the marketing-related component 146 can ask the user to post his or her commentary to a marketplace site which sells the Email application that has been modified. In another implementation, the marketing-related component 146 can optionally offer the user a reward for posting the commentary, such as a discount on an upgrade to the Email application.

In conclusion to Subsection A.1, the environment 102 offers one or more advantages. For example, the environment 102 can modify program components on a per-user basis. Each modification is customized for each respective user because it is based on feedback information provided by that user. This provision improves overall user satisfaction with a program component (e.g., an Email application) because each instantiation of the program component is configured to suit the needs and preferences of an individual user who interacts with it.

In addition, the environment 102 can produce the program modifications in an automated manner or at least a partially automated manner. As such, the environment 102 can eliminate or reduce the use of human personnel, including individuals who might otherwise be employed to collect feedback information, analyze feedback information, develop modifications that address the feedback information, and so on. By eliminating (or reducing) the human involvement, the environment 102 can expedite the release of modifications, increase the frequency at which modifications can be made, increase the accuracy and reliability of the modifications, and reduce the financial expenditure that is required to produce these modifications. The above potential advantages are cited by way of example, not limitation; other implementations may confer other benefits.

A.2. The Modification Determination Component

Figure 6:
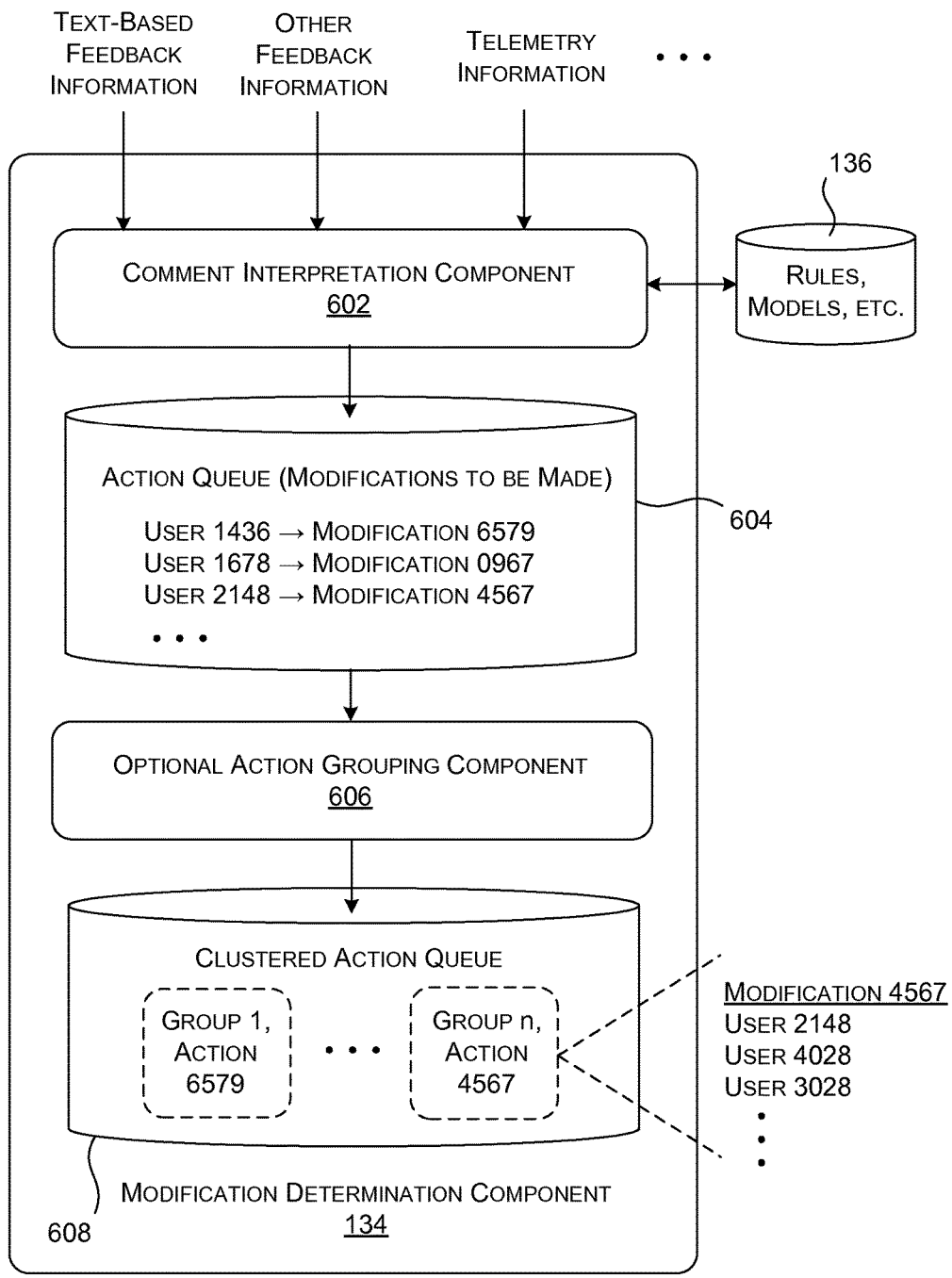
FIG. 6 shows one implementation of a modification determination component, which is a part of the environment of FIG. 1.

FIG. 6 shows one implementation of the modification determination component 134. As set forth above, the modification determination component 134 determines what modifications are to be made to at least one program component under consideration on a per-user basis, based on the user feedback profile associated with each user.

In one implementation, the modification determination component 134 includes a comment interpretation component 602 for interpreting at least one comment made by a particular user. The comment interpretation component 602 can perform analysis with respect to plural users in serial fashion, parallel fashion, or some combination thereof.

The comment interpretation component 602 receives user-related information pertaining to a user's interaction with at least one program component, as expressed in that user's user feedback profile. The user-related information for a particular user can include linguistic feedback information (e.g., free-form text-based feedback information), other feedback information (e.g., gesture-based feedback information, facial expression feedback information, etc.), telemetry information, and so on. Based on the collected user-related information, the comment interpretation component 602 determines one or more modifications to be made to at least one program feature, for that particular user and for at least one program component. In making this decision, the comment interpretation component 602 relies on a set of rules and/or model parameter values provided in the data store 136. The comment interpretation component 606 can perform its analysis in different ways, examples of which are provided below.

The comment interpretation component 602 stores its results in a data store 604. The results may constitute a set of entries that summarize the modifications to be made. Each entry, in turn, may identify the user associated with the modification to be made, together with the modification to be made. The modification to be made may be directed to a particular program feature associated with a particular program component. For example, one such modification may be directed to a sign-out feature of an Email program. Or the modification to be made may correspond to a program feature that is a common feature to two or more program components.

An optional grouping component 606 can sort the modifications to be made (as indicated in the data store 604) into different groups. Each group corresponds to a single modification to be made; its membership includes all those users who will be the recipients of that same modification. For example, the grouping component 606 can establish a group that identifies all of the users who will receive the same change to the sign-out behavior of an Email application. These users will receive the same modification because they have previously provided feedback information that expressed the same general complaint about this program feature. The grouping component 606 stores the identified groups in a data store 608.

Figure 7:
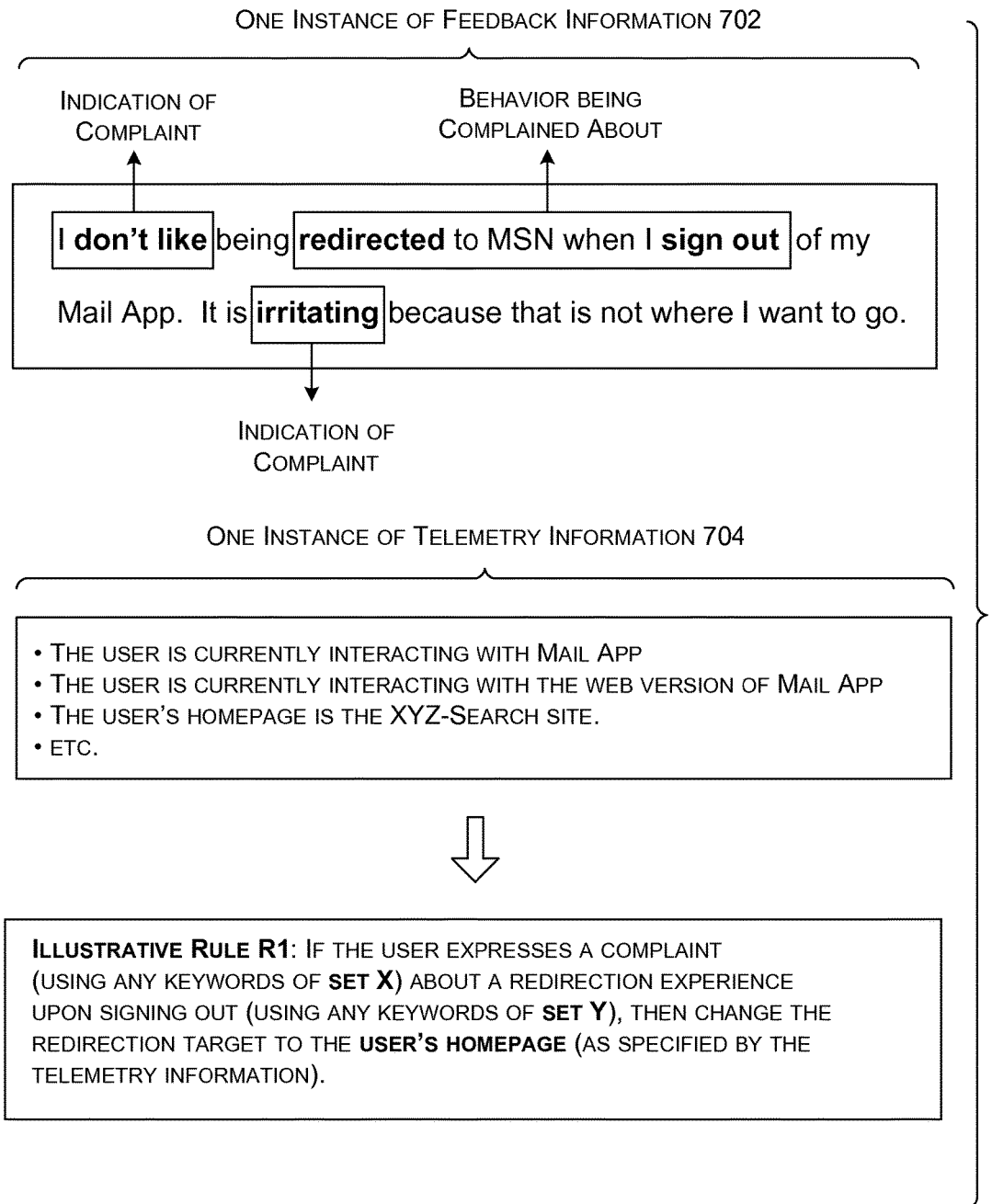
FIG. 7 shows an example of one type of rule that can be applied by a rules-based implementation of the modification determination component of FIG. 6.

FIG. 7 shows an example of one manner of operation of the comment interpretation component 602 of FIG. 6. In this case, assume that the data store 136 provides a set of rules. Each rule is associated with one or more sets of keywords, in optional conjunction with one or more other specified matching conditions. Each rule is also associated with a particular modification to be made to a program feature, upon determining that the rule is to be invoked. The comment interpretation component 602 operates by matching the user feedback profile (or parts thereof) against each rule to determine zero, one, or more rules that match the user feedback profile. The comment interpretation component 602 then stores an indication of the modification(s) to be made, as identified by the matching rule(s).

For example, assume that the user feedback profile under consideration contains a single text-based comment 702 that reads, "I don't like being redirected to MSN when I sign out of my Mail App. It is irritating because that is not where I want to go." This comment 702 contains clues to the user's intent. First, the comment 702 contains words that indicate that it is directed to a certain program component, namely, "Mail App." Second, the comment 702 contains words that indicate that it is directed to the sign-out feature of the Mail App (such as the phrase "redirected to MSN when I sign out"). Third, the comment 702 contains words to indicate that the user is dissatisfied with the identified program feature (such as the phrases, "I don't like" and "irritating").

The user feedback profile also provides telemetry information 704. The telemetry information confirms that the user is currently interacting with Mail App. The telemetry information also clarifies that the user is interacting with the web version of the Mail App. The telemetry information also indicates that the user's homepage is a hypothetical XYZ-Search site, and so on.

The comment interpretation component 602 determines that the keywords in the comment match at least a Rule R1. More specifically, the Rule R1 specifies that it is to be invoked when any individual comment contains any keyword contained in a first set of keywords, together with any keyword contained in a second set of keywords. The first set of keywords is intended to capture the user's disapproval; for instance, it may contain keywords such as "don't like," "irritating," etc. The second set of keywords is intended to capture the particular program feature being complained about; for instance, it may contain keywords such as "redirected," "sign out," etc.

Rule R1 specifies a modification that entails changing the redirection experience upon sign-out, so that the user is henceforth directed to his or her homepage. To carry out this rule, the modification component 138 extracts an indication of the user's homepage from the collected telemetry information, if provided.

Although not shown in FIG. 7, the Rule R1 may have an application scope that determines how widely it is to be applied. In some cases, the Rule R1 may make a change to only a specific version of the program component that the user complained about. In other cases, the Rule R1 may apply to two or more versions of the program component. In other cases, the Rule R1 may apply across a family of applications that have the same program feature that is being changed, even though the applications on a whole may perform different functions, and so on.

Rule R1 is merely illustrative. More generally, a contributor who is authorized to create rules can create rules that specify any matching conditions of any variation and complexity. For example, some rules can operate by considering each comment as a self-contained focus of inquiry (that is, by not taking into consideration the corpus of user comments as a whole). Other rules can operate by analyzing the linguistic content of two or more comments. For example, other rules can consider a corpus of the user's comments as a single linguistic source to be mined for keyword information. The corpus may be restricted to contain comments directed to the single program component under consideration, or may provide comments directed to two or more (or all) program components. In addition, a rule may specify a matching condition based on the frequency at which certain keywords appear in the corpus of the user's comments.

Further, some rules can also specify matching conditions associated with the telemetry information, in addition to the matching conditions associated with the keyword information. For example, this kind of rule may indicate that it applies only if the user is using a particular version of a program component, and/or only if the user has subscribed to a particular service, and/or only if the user has configured the program component in a particular manner, and/or only if the program component is currently exhibiting a particular type of performance, and so on.

The above-described rule constraints are described by way of example, not limitation. Other implementations can adopt rules that specify yet other kinds of matching conditions.

Figure 8:
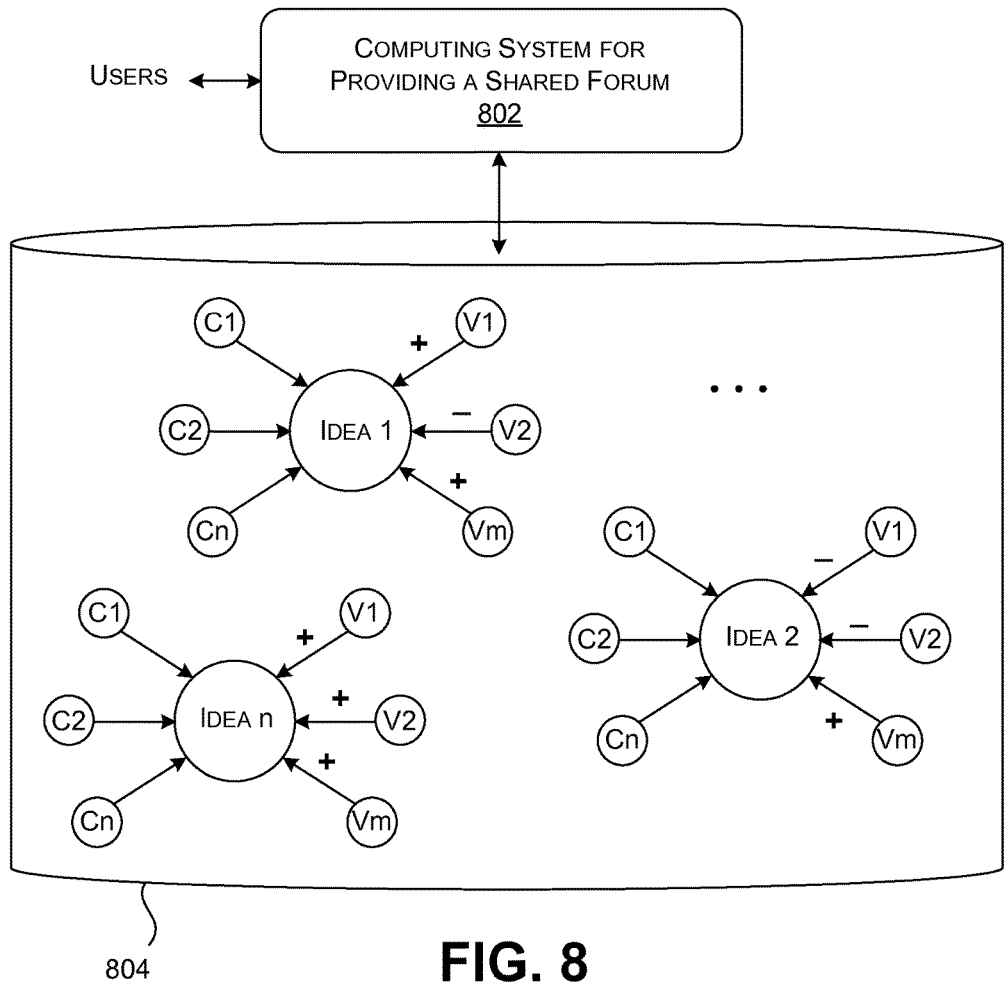
FIG. 8 shows a computing system which provides a shared forum pertaining to program features.

Advancing to FIG. 8, this figure shows a computing system 802 that maintains a shared forum of any nature, such as a blog, a social network site, a marketplace site, etc. The computing system 802 allows a user to enter comments regarding program components. The computing system 802 also allows a user to make comments regarding someone else's preexisting comment. The feedback blog system also allows a user to vote on someone else's preexisting comment. The vote expresses an extent to which the user agrees with that comment.

The computing system 802 stores the comments in a data store 804. As shown there, each initial comment regarding a particular program feature constitutes an anchor "idea." Or the computing system 802 may seed the shared forum with an initial set of anchor ideas, e.g., by presenting category headings associated with different ideas. For example, one anchor idea may be devoted to expressing complaints regarding the sign-out experience of an Email application. The data store 804 groups all supplemental comments and votes pertaining to an idea with the idea itself.

The computing system 802 constitutes a feedback-providing point. The information collection component 120 can collects the comments from this FPP on a push basis, a pull basis, or some combination thereof. In some cases, for example, the computing system 802 also incorporates a feedback-providing component which actively forwards comments to the information collection component 120. In other cases, the information collection component 120 may implement a feedback-providing component which scrapes the comments from the data store 804.

Figure 9:
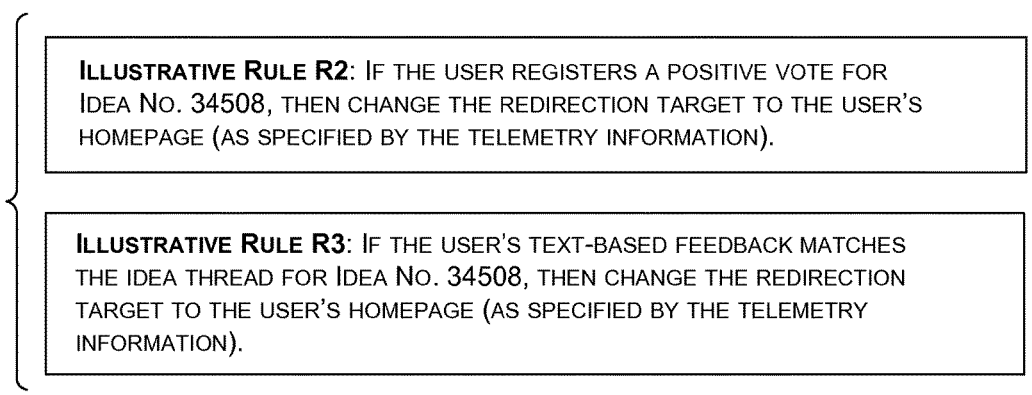
FIG. 9 shows two other rules that can be applied by a rules-based implementation of the modification determination component of FIG. 6. These rules leverage information maintained by the computing system of FIG. 8.

FIG. 9 shows two rules that can leverage the type of information provided in the data store 804 shown in FIG. 8. For instance, assume that the hypothetical Idea No. 34508 pertains to a forum for registering complaints about the sign-out experience associated with an Email application. Rule R2 specifies that it is to be invoked whenever a user's user feedback profile indicates that he or she has expressed a positive vote for Idea No. 34508, or expressed agreement with that idea through some other mechanism. If such a condition is satisfied, Rule R2 specifies that the Email application should be changed such that, upon signing out of the Email application, the user will be directed to his or her homepage, rather than the MSN site.

Rule R3 specifies that it is to be invoked whenever one or more comments made by the user (as expressed in the user's user feedback profile) match keyword information associated with other people's comments associated with a particular idea (e.g., associated with Idea No. 34508). If such a condition is satisfied, Rule R2 specifies that the Email application should be changed such that, upon signing out of the Email application, the user will be directed to his or her homepage, rather than the MSN site. In other words, the Rule R3 does not internally dictate matching keyword information, as does Rule R1. Rather, the Rule R3 specifies that it applies when the user's comments resemble other people's comments, where it is pre-established that those other comments pertain to an unfavorable response to the sign-out behavior of an Email application. The Rule R3 can specify any environment-specific ranking condition to define what degree of agreement between the user's comments and other people's comments is considered sufficient to constitute a match.

Figure 10:
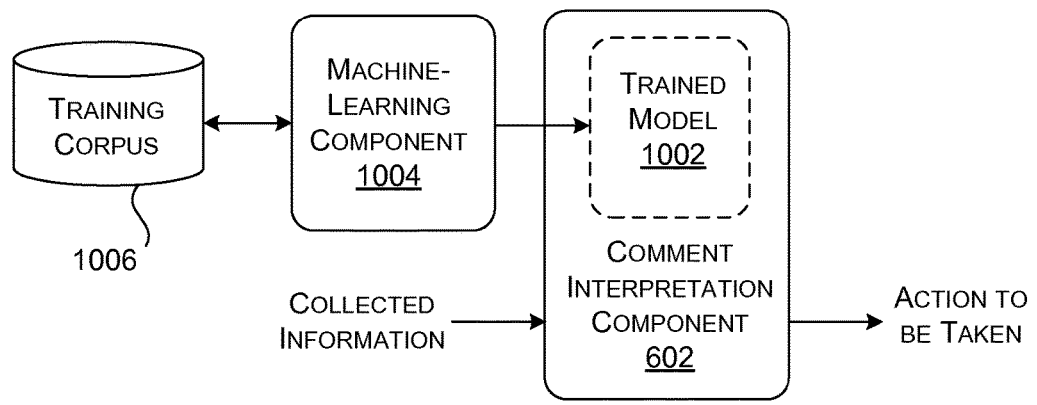
FIG. 10 shows an implementation of the modification determination component of FIG. 6 that uses a machine-learned model.

FIG. 10 shows another implementation of the comment interpretation component 602 of FIG. 6. Here, the comment interpretation component 602 corresponds to a classifier component that uses a machine-trained model 1002. The machine-trained model 1002 provides a set of iteratively-computed parameter values. The comment interpretation component 602 operates by using the model 1002 to map the information provided by a user feedback profile (e.g., feedback information, telemetry information, etc.) to an indication of an action to be taken. In operation, the comment interpretation component 602 can first convert the information in the user feedback profile to one or more input vectors of numeric values, e.g., using a bag-of-words representation. The comment interpretation component 602 can then use the model 1002 to map the input vector(s) to an output value (or output vector). That output value (or vector) identifies a modification to be made to one or more program components.

A machine-learning component 1004 can produce the model 1002 by operating on a corpus of training examples in a data store 1006. The machine-learning component 1004 can use any machine-learning technique to produce any corresponding machine-learned model, such as by applying, without limitation, any of: a regression technique (such as a logistic regression technique); a support vector machine technique; a nearest neighbor technique; a decision tree technique; a clustering technique; a neural network technique (such as a deep-structured neural network technique); a Bayesian network technique; and so on. For example, a deep-structured neural network model, produced by a neural network training technique, maps a representation of a linguistic comment into an embedding (e.g., an output vector) in a low-dimensional semantic space. The comment interpretation component 602 can determine a modification to be made based on at least the embedding.

The training corpus can include an empirical (historical) data set that can be used to produce the model 1002. For example, each training example may represent a pairing of information extracted from a user feedback profile (such as keyword information extracted from a user feedback profile) with an indication of a modification to be made on the basis of that extracted information. The training example can also provide a label that indicates whether the modification is considered appropriate or not appropriate. For example, a human evaluator can add those labels and/or an automated tool can produce those labels. For instance, a recipient-user of a modification may provide rating information that may serve as a label associated with the modification. A pairing for which the modification is considered appropriate constitutes a positive training example. A pairing for which the modification is not considered appropriate is considered a negative example. The machine-learning component 1004 automatically learns the inherent logic associated with the positive and negative examples in producing the model 1002.

Figure 11:
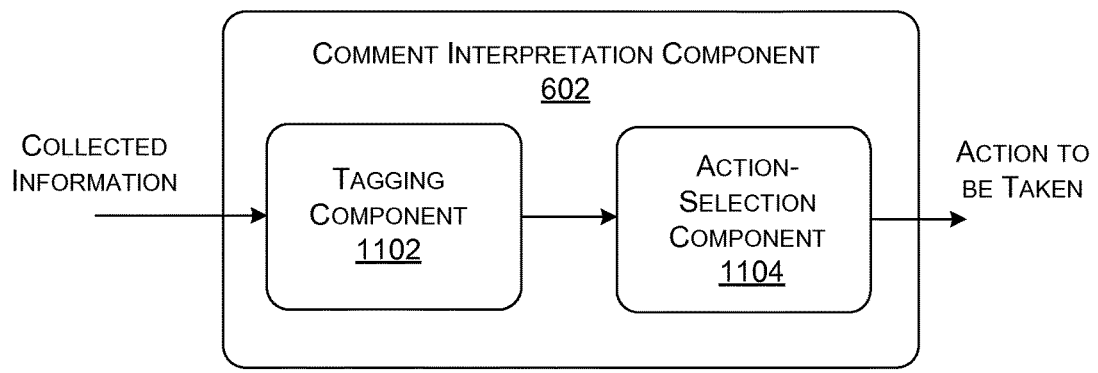
FIG. 11 shows another implementation of the modification determination component of FIG. 6. This implementation determines a modification to be made to a program feature in two or more stages of analysis.

FIG. 11 shows another implementation of the comment interpretation component 602 of FIG. 6. In this implementation, the comment interpretation component 602 includes a staged analysis of the user feedback profile, including any number of stages. Here, there are two stages. In a first stage, a tagging component 1102 can apply tags to the words in a user's comment. The tags classify the semantic roles of the respective words in the comment. For example, the tagging component 1102 can tag words with the labels <expression of approval/disapproval>, <expression of product feature>, <expression of undesirable behavior>, etc. The <expression of approval/disapproval> tag indicates that a word or phrase is likely to express the user's approval or disapproval of a program feature. The <expression of product feature> tag indicates that a word or phrase is describing a particular program feature. The <expression of undesirable behavior> tag indicates that a word or phrase is describing a particular behavior being complained about, and so on. An action-selection component 1104 can then analyze the tagged words and phrases (in objection conjunction with telemetry information) to determine a modification to be made to one or more program features. In other words, the tags provided by the tagging component 1102 constitute additional feature values which are fed to the action-selection component 1104.

In one implementation, the tagging component 1102 uses a machine-trained model 1106 to perform its task. For example, the machine-trained model 1106 may constitute a Conditional Random Fields (CRF) model or the like. The action-selection component 1104 can likewise use a machine-trained model. In another implementation, the tagging component 1102 and/or the action-selection component 1104 can be implemented as a rules-based system.

In another multi-stage approach (not shown), an initial intent-determination component can use a machine-learned model to determine the intent associated with a user's comment (or plural comments). A machine-learned tagging component can then use the intent information as guidance in tagging the individual words and phrases in the user's comment (or comments).

Other variations can provide different architectures of the modification determination component 134 as a whole. For example, in another implementation, the modification determination component 134 can use the grouping component 606 to first group the users' comments into different categories prior to the analysis performed by the comment interpretation component 602. For example, the grouping component 606 can group all comments (produced by different users) that appear to be directed to the sign-out experience of an Email application. The comment interpretation component 602 can then operate on the group of comments as a whole to determine what modification (if any) is appropriate for that group. The modification component 138 can then apply the identified modification, as an integrated batch task, to all users that are associated with the identified group.

In one implementation, the grouping component 606 can perform grouping analysis by using a deep-structured neural network to map each comment into an embedding in a low-dimensional semantic space. Then the grouping component 606 can form clusters of similar embeddings. Some of these clusters pertain to complaints about specific respective program features. Other clusters may not necessarily pertain to complaints.

A.3. The Modification Component

Figure 12:
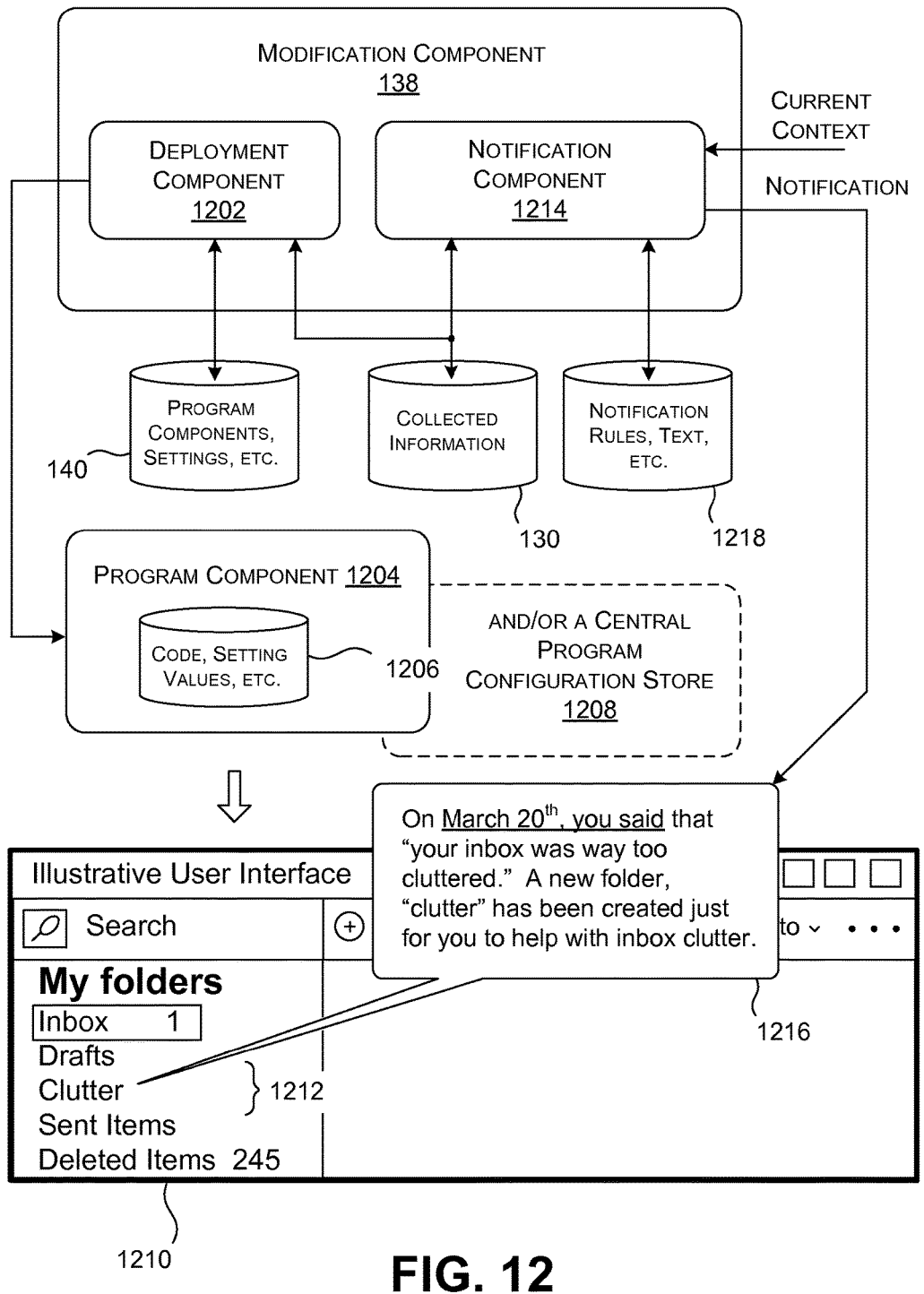
FIG. 12 shows one implementation of a modification component, which is another part of the environment of FIG. 1.

FIG. 12 shows one implementation of the modification component 138. The purpose of the modification component 138 is to carry out the modification identified by the modification determination component 134.

More specifically, a deployment component 1202 performs the actual operation of modifying a program feature of a program component. In the present case, FIG. 12 shows that the deployment component 1202 modifies a program component 1204. The program component 1204 may represent program code provided at a user computing device, a remote computing system, etc., or any combination thereof. A program-specific data store 1206 may store at least some of the code and/or setting values associated with the program component 1204. Alternatively, or in addition, a central store 1208 may store at least some of the code and/or setting values associated with the program component 1204. More specifically, the central store 1208 may store code and/or setting values pertaining to plural program components associated with the user.

As mentioned in Subsection A.1, the deployment component 1202 can deploy a modification in different ways. In one approach, the deployment component 1202 can provide instructions which have the effect of changing one or more setting values in the data store 1206 and/or the central store 1208. The changed setting values have the effect of turning one or more program features on or off. In another approach, the deployment component 1202 can send new program code to the data store 1206 and/or the central store 1208. The new program code has the effect of changing the behavior of an existing program feature, completely removing an existing program feature, and/or introducing a new program feature.

For example, assume, in the example of FIG. 12, that the user who is the target of the modification has previously expressed a complaint that his "inbox was way too cluttered." In response, the modification determination component 134 determines that it is appropriate to add a new folder to the user's list of folders. That new folder is named "clutter." The deployment component 1202 can add new code to the data store 1206 and/or central store 1208 which generates the desired behavior, when executed. Following the modification, the user will be confronted with a user interface presentation 1210. That user interface presentation 1210 includes a new folder 1212, labeled "clutter."

The deployment component 1202 can also optionally deploy the same modification to a group of users. For instance, the comment interpretation component 602 (of FIG. 6) may determine that several people have made the same basic complaint about the amount of clutter in their inboxes. The comment interpretation component 602 may also determine that a particular rule is the remedy for that complaint. The grouping component 606 (of FIG. 6) may then identify the group of users who are to receive the indicated program fix. The deployment component 1202 may then deploy this fix for the designated users at the same time, or otherwise as an integrated batch task.

A notification component 1214 notifies the user of the modification that has been made. For example, the notification component 1214 can provide a notification message 1216 when the user first engages the user interface presentation 1210 in which the new folder 1212 appears. The notification component 1214 can also fashion the notification message 1216 so that it: (a) specifies why the modification has been made; and (b) directs the user's attention to the feature that has been changed. The notification component 1214 may optionally construct the notification message 1216 based on predetermined message templates provided in a data store 1218.

The notification component 1214 may also rely on one or more notification presentation rules (e.g., as provided in the data store 1218) in determining: (a) the timing at which to present a notification message; and/or (b) the method to use in presenting the notification message. For example, one notification presentation rule can have the effect of throttling the number of notifications that the notification component 1214 presents within a prescribed span of time, and/or with respect to other limits. For instance, one notification presentation rule can instruct the notification component 1214 to present no more than one notification pertaining to a program component within each user application session. This notification presentation rule may be advantageous to avoid bombarding the user with too many notifications within a short span of time.

In addition, each notification may have a priority value associated therewith, corresponding to an assessed importance of notifying the user of a modification that has been made (or will be made). One notification presentation rule may instruct the notification component 1214 that, if there are two or more pending notifications, it is to present the notification that has the highest priority value. The notification presentation rule may furthermore instruct the notification component 1214 to increase an unsent notification's priority level value as a function of elapsed time, such that, if it is passed over in favor of one or more other notifications, its importance will progressively increase; this characteristic, in turn, makes it more likely that a passed-over notification will eventually be presented to the user.

FIG. 12 shows the case in which the notification component 1214 displays the notification message 1216 in spatial proximity to the program feature that has been added. This contextual presentation is useful because, as described above, it facilitates the user's understanding of the modification that has been made. But in other cases, a notification presentation rule may instruct the notification component 1214 to display a notification when the user first signs into a program component, or signs out of the program component, and/or at some other juncture.

B. Illustrative Processes

Figure 13:
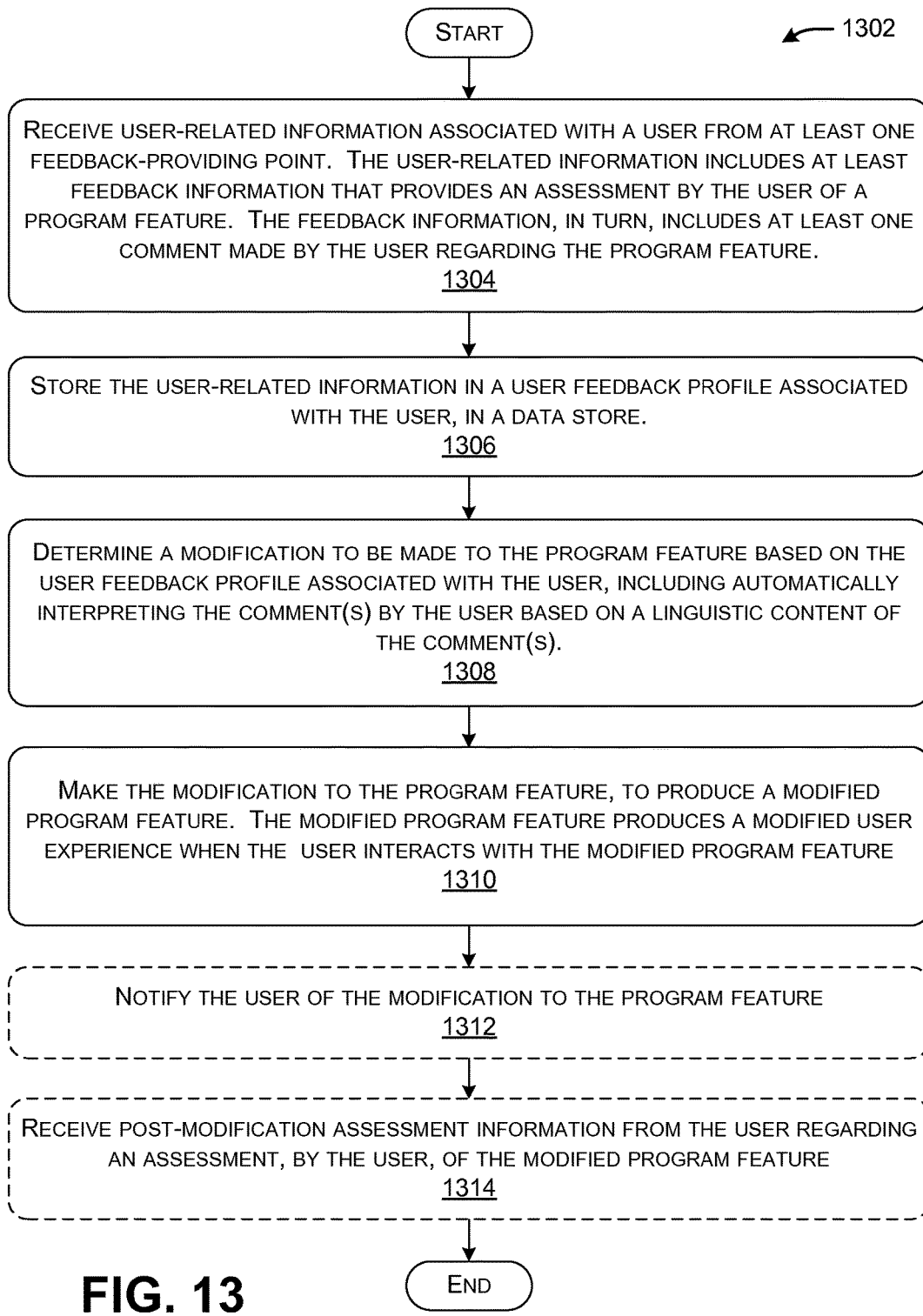
FIG. 13 shows a process that represents one manner of operation of the environment of FIG. 1, from the standpoint of a feature modification system (FMS).
Figure 14:
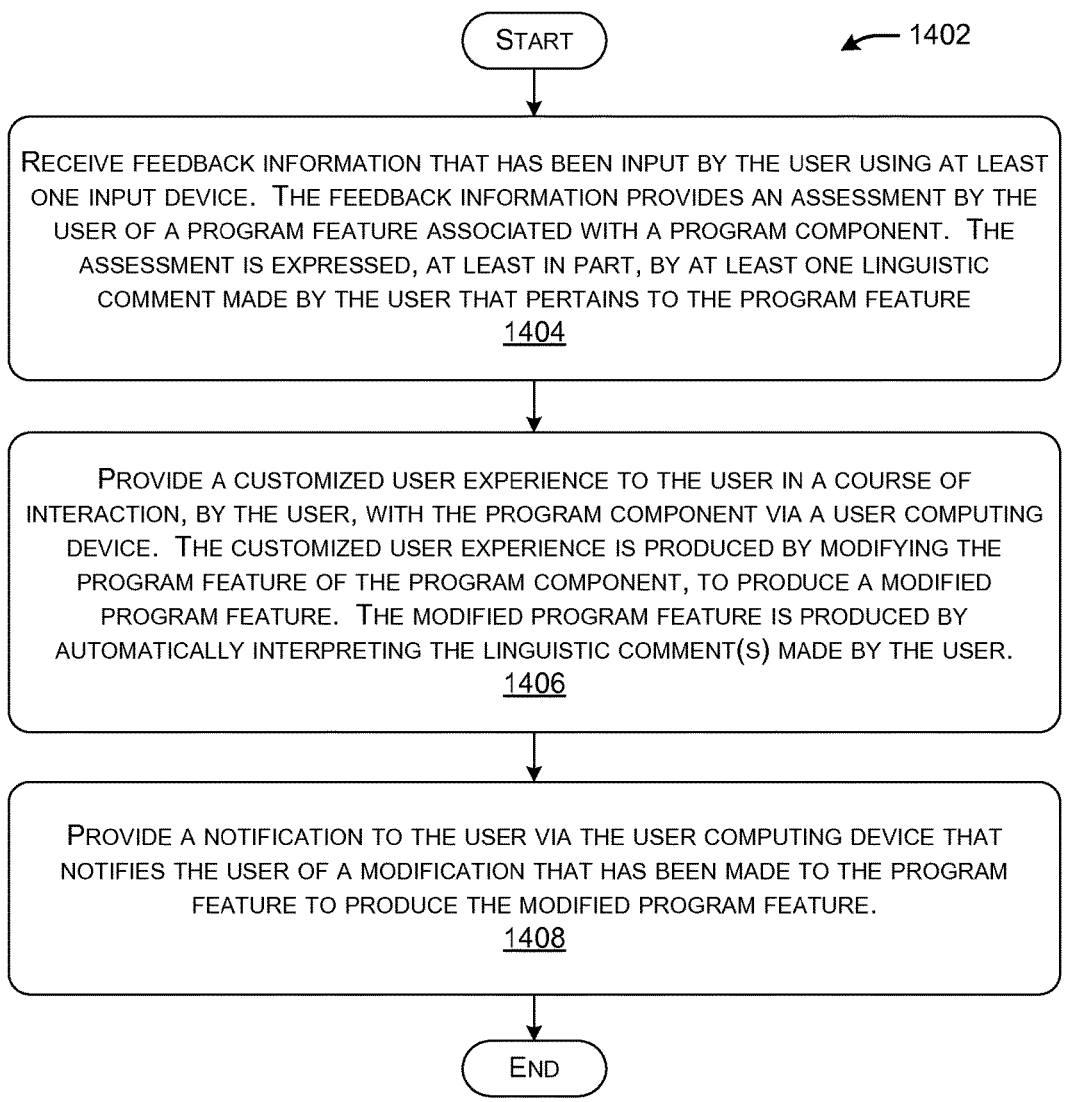
FIG. 14 shows a process that represents one manner of operation of the environment of FIG. 1, from the standpoint of a user computing device.

FIGS. 13 and 14 show processes (1302, 1402) that explain one manner of operation of the environment 102 of Section A in flowchart form. Since the principles underlying the operation of the environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 13 describes the operation of the environment 102 from the standpoint of the feature modification system (FMS) 118. In block 1304, the feature modification system (FMS) 118 receives user-related information associated with a user from at least one feedback-providing point. The user-related information includes at least feedback information that provides an assessment by the user of a program feature. The feedback information, in turn, includes at least one comment made by the user regarding the program feature. The user-related information may optionally also include telemetry information that describes one or more aspects of an operation of the program feature, as the operation affects the user. In block 1306, the FMS 118 stores the user-related information in a user feedback profile associated with the user, in a data store.

In block 1308, the FMS 118 determines a modification to make to the program feature based on the user feedback profile associated with the user. Block 1308 includes automatically interpreting the comment(s) made by the user based on a linguistic content of the comment(s), in optional conjunction with the telemetry information. In block 1310, the FMS 118 makes the modification to the program feature, to produce a modified program feature. The modified program feature produces a modified user experience when the user interacts with the modified program feature.

In block 1312, the FMS 118 optionally notifies the user of the modification to the program feature. In block 1314, the FMS 118 optionally receives post-modification assessment information from the user regarding the user's assessment of the modified program feature.

FIG. 14 describes the operation of the environment 102 from the standpoint of the user computing device 108, with which the user interacts with the FMS 118. In block 1404, the user computing device 108 (or some other computing device operated by the user) receives feedback information that has been input by the user using at least one input device. The feedback information provides an assessment by the user of a program feature associated with a program component. Further, the assessment is expressed, at least in part, by at least one linguistic comment made by the user that pertains to the program feature. In block 1406, the user computing device 108 provides a customized user experience to the user in a course of interaction, by the user, with the program component. The customized user experience is produced by modifying the program feature of the program component, to produce a modified program feature. More specifically, the modified program feature is produced by automatically interpreting the linguistic comment(s) made by the user. In block 1408, the user computing device 108 provides a notification to the user that notifies the user of a modification that has been made to the program feature to produce the modified program feature.

C. Representative Computing Functionality

Figure 15:
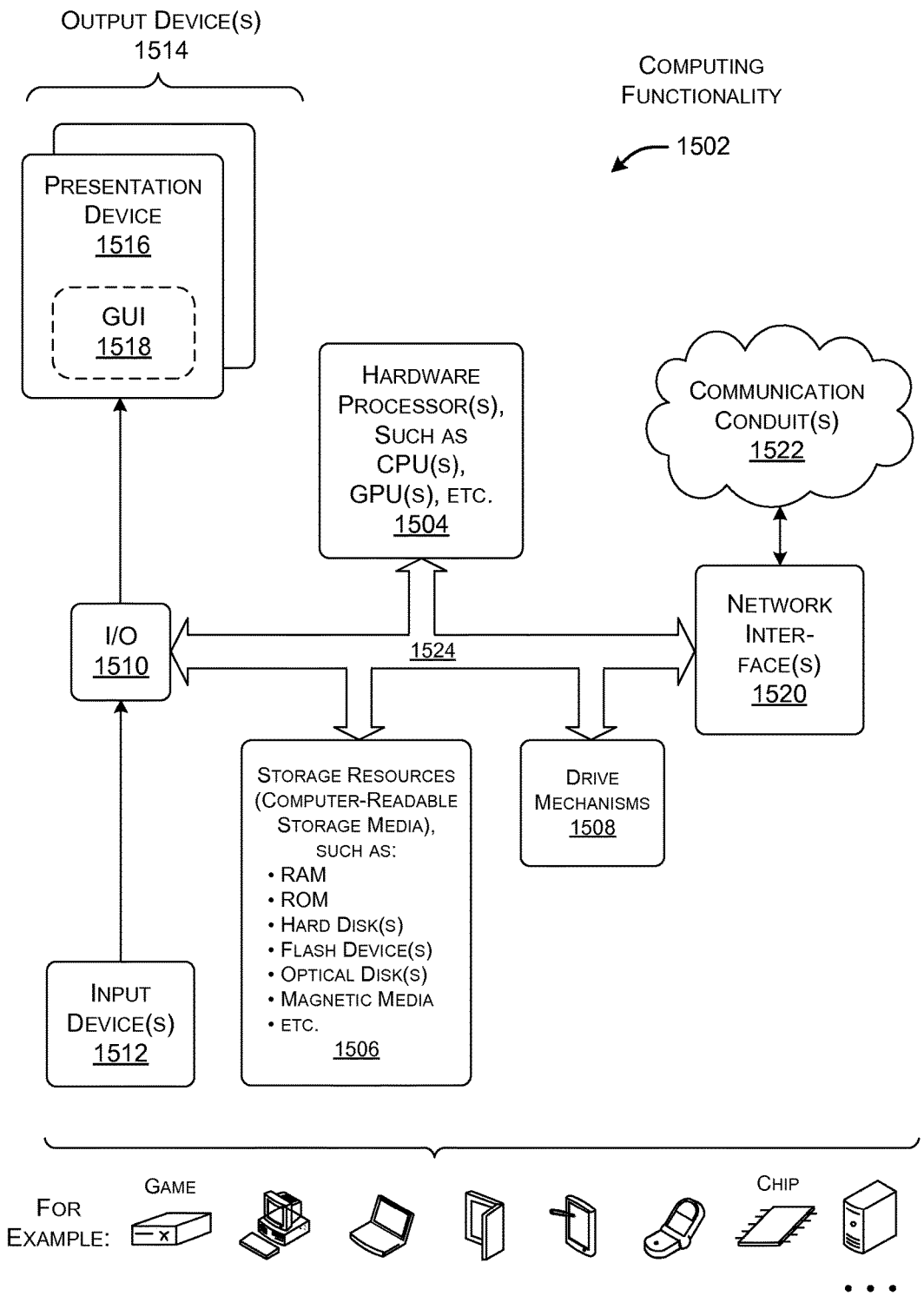
FIG. 15 shows illustrative computing functionality that can be used to implement any aspect of the features shown in the foregoing drawings.

FIG. 15 shows computing functionality 1502 that can be used to implement any aspect of the environment 102 set forth in the above-described figures. For instance, the type of computing functionality 1502 shown in FIG. 15 can be used to implement any aspect of the feature modification system (FMS) 118, any aspect of the user computing devices 104, any aspect of the computing systems 110, any aspect of the feedback-providing components, and so on. In all cases, the computing functionality 1502 represents one or more physical and tangible processing mechanisms.

The computing functionality 1502 can include one or more hardware processors 1504, such as one or more central processing units (CPUs), and/or one or more graphical processing units (GPUs), and so on. The computing functionality 1502 can also include any storage resources (also referred to as computer-readable storage media or computer-readable storage medium devices) 1506 for storing any kind of information, such as machine-readable instructions, settings, data, etc. Without limitation, for instance, the storage resources 1506 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1502. The computing functionality 1502 may perform any of the functions described above when the hardware processor(s) 1504 carry out computer-readable instructions stored in any storage resource or combination of storage resources. The computing functionality 1502 also includes one or more drive mechanisms 1508 for interacting with any storage resource, such as a hard disk drive mechanism, an optical disk drive mechanism, and so on.

The computing functionality 1502 also includes an input/output component 1510 for receiving various inputs (via input devices 1512), and for providing various outputs (via output devices 1514). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 1516 and an associated graphical user interface presentation (GUI) 1518. The presentation device 1516 may correspond to a physical monitor (e.g., a charge-coupled display device, a cathode ray tube device, a projection mechanism, etc.). Other output devices include a printer, a model-generating mechanism, a tactile output mechanism, an archival mechanism (for storing output information), and so on. The computing functionality 1502 can also include one or more network interfaces 1520 for exchanging data with other devices via one or more communication conduits 1522. One or more communication buses 1524 communicatively couple the above-described components together.

The communication conduit(s) 1522 can be implemented in any manner, e.g., by a local area computer network, a wide area computer network (e.g., the Internet), point-to-point connections, etc., or any combination thereof. The communication conduit(s) 1522 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1502 (and its hardware processor) can be implemented using one or more of: Field-Programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method is described, performed by one or more computing devices, for providing a customized experience to at least one user. The method includes receiving, by an information collection component, feedback information associated with a user from at least one feedback-providing point; the feedback information provides an assessment by the user of a program feature, the assessment being expressed, at least in part, by at least one comment made by the user. The method then entails storing, by the information collection component, the feedback information in a user feedback profile associated with the user, in a data store. The method then entails determining, by a modification determination component, a modification to be made to the program feature based on the user feedback profile associated with the user. This determining operation includes automatically interpreting the comment(s) made by the user based on a linguistic content of the comment(s). Finally, the method includes making, by a modification component, the modification to the program feature to produce a modified program feature. The modified program feature produces a modified user experience when the user interacts with the modified program feature using a user computing device.

According to a second aspect, the above-referenced receiving feedback information includes receiving feedback information from the user in a course of interaction by the user with the program feature.

According to a third aspect, the above-referenced receiving feedback information includes receiving feedback information from a network-accessible computing system, the computing system maintaining a shared forum for receiving, storing, and presenting comments by users pertaining to program features.

According to a fourth aspect, the program feature pertains to a particular program component. Further, the above-referenced storing operates to store the feedback information in a section of the user feedback profile that is dedicated to the program component.

According to a fifth aspect, the above-referenced receiving further includes receiving telemetry information that describes one or more aspects of an operation of the program feature, as the operation affects the user. Further, the above-referenced storing also stores the telemetry information in the user feedback profile. Further, the above-referenced determining of the modification to be made is based on the linguistic content of the comment(s) in conjunction with the telemetry information.

According to a sixth aspect, the above-referenced automatically interpreting entails identifying at least one rule that matches keyword information in the comment(s) made by the user, each rule specifying an identified modification to be made to the program feature. The above-referenced making includes making each modification identified by each rule.

According to a seventh aspect, a network-accessible computing system maintains a shared forum for receiving, storing, and presenting comments by users pertaining to program features, the comments being organized into a plurality of idea categories. The above-referenced automatically interpreting entails identifying at least one idea category that is associated with the comment(s) made by the user. Further, the above-referenced making includes applying at least one rule that is associated with the above-referenced at least one idea category.

According to an eighth aspect, the above-referenced determining a modification to be made includes using at least one machine-trained model to map the comment(s) to an indication of the modification to be made. The above-referenced making entails making the modification associated with the indication.

According to a ninth aspect, the above-referenced receiving feedback information includes receiving feedback information from a plurality of users regarding one or more program features. The above-referenced determining a modification to be made further includes identifying at least one user group, each user group being associated with a same modification to be made to a program feature for a benefit of two or more users in the user group. Further, the above-referenced making includes, as an integrated batch task, making a modification associated with each user group for all users that are associated with that user group.

According to a tenth aspect, the method further includes notifying the user of the modification to the program feature.

According to an eleventh aspect, the above-referenced notifying includes alerting the user to the modification to the program feature in a context of interaction by the user with the program feature that has been changed.

According to a twelfth aspect, the above-referenced notifying includes choosing a timing at which to present a notification to the user, and/or a method with which to present the notification to the user, based on at least one notification presentation rule.

According to a thirteenth aspect, the above-referenced notifying includes alerting the user to a nexus between the modification to the program feature and the feedback information provided by the user.

According to a fourteenth aspect, the method further includes receiving post-modification assessment information from the user regarding an assessment by the user of the modified program feature.

According to a fifteenth aspect, the method further includes determining whether the post-modification assessment information satisfies a user satisfaction threshold value. The method further includes, if the post-modification assessment information satisfies the user satisfaction threshold value, inviting the user to post the assessment of the modified program feature to at least one shared forum.

According to a sixteenth aspect, a system is described, implemented by or more computing devices, for providing a customized experience to at least one user. The system includes an information collection component that is configured to receive feedback information associated with a user from at least one feedback-providing point; the feedback information provides an assessment by the user of a program feature. The assessment is expressed, at least in part, by at least one comment made by the user. The information collection component stores the feedback information in a user feedback profile associated with the user, in a data store. The system further includes a modification determination component that is configured to determine a modification to be made to the program feature based on the user feedback profile associated with the user. The modification determination component determines the modification to be made by, at least in part, automatically interpreting the comment(s) by the user based on a linguistic content of the comment(s). The system further includes a modification component that is configured to: make the modification to the program feature to produce a modified program feature, the modified program feature producing a modified user experience when the user interacts with the modified program feature; and notify the user of the modification to the program feature. The system further includes a post-modification feedback component configured to receive post-modification assessment information from the user regarding an assessment, by the user, of the modified program feature.

According to a seventeenth aspect, the information collection component is further configured to: receive telemetry information that describes one or more aspects of an operation of the program feature, as the operation affects the user; and store the telemetry information in the user feedback profile. The modification determination component is further configured to determine the modification to be made based on the linguistic content of the comment(s) in conjunction with the telemetry information.

According to an eighteenth aspect, the modification determination component is configured perform the above-referenced automatically interpreting by identifying at least one rule that matches keyword information in the comment(s), each rule specifying an identified modification to be made to the program feature.

According to a nineteenth aspect, the modification determination component is configured use at least one machine-trained model to map the comment(s) to an indication of the modification to be made.

According to a twentieth aspect, a computer-readable storage medium is described for storing computer-readable instructions, the computer-readable instructions, when executed by one or more hardware processor devices, performing a method. The method includes: receiving user-related information associated with a user from at least one feedback-providing point. The user-related information includes at least: feedback information that provides an assessment by the user of a program feature, the feedback information, in turn, including at least one comment made by the user regarding the program feature; and telemetry information that describes one or more aspects of an operation of the program feature, as the operation affects the user. The method further includes storing the user-related information in a user feedback profile associated with the user, in a data store. The method further includes determining a modification to be made to the program feature based on the user feedback profile associated with the user, the above-referenced determining including automatically interpreting the comment(s) by the user based on a linguistic content of the comment(s), in conjunction with the telemetry information. The method further includes making the modification to the program feature to produce a modified program feature, the modified program feature producing a modified user experience when the user interacts with the modified program feature. The method further includes notifying the user of the modification to the program feature. Finally, the method includes receiving post-modification assessment information from the user regarding an assessment, by the user, of the modified program feature.

According to a twenty-first aspect, a method is described for providing a customized experience to a user. The method includes receiving feedback information that has been input by the user using at least one input device. The feedback information provides an assessment by the user of a program feature associated with a program component. The assessment is expressed, at least in part, by at least one linguistic comment made by the user that pertains to the program feature. The method further includes providing a customized user experience to the user in a course of interaction, by the user, with the program component via a user computing device. The customized user experience is produced by modifying the program feature of the program component, to produce a modified program feature. More specifically, the modified program feature is produced by automatically interpreting the linguistic comment(s) made by the user. The method further includes providing a notification to the user via the user computing device that notifies the user of a modification that has been made to the program feature to produce the modified program feature.

According to a twenty-second aspect, a user computing device is described for providing a customized experience to a user. The user computing device includes logic configured to receive feedback information that has been input by the user using at least one input device. The feedback information provides an assessment by the user of a program feature associated with a program component. The assessment is expressed, at least in part, by at least one linguistic comment made by the user that pertains to the program feature. The user computing device further includes logic configured to provide a customized user experience to the user via one or more user interface mechanisms, in a course of interaction, by the user, with the program component. The customized user experience is produced by modifying the program feature of the program component, to produce a modified program feature. More specifically, the modified program feature is produced by automatically interpreting the linguistic comment(s) made by the user. The user computing device further includes logic configured to provide, via one or more user interface mechanisms, a notification to the user that notifies the user of a modification that has been made to the program feature to produce the modified program feature.

A twenty-third aspect corresponds to any combination (e.g., any permutation or subset) of the above-referenced first through twenty-second aspects.

A twenty-fourth aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-third aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by one or more computing devices, the method comprising:
   receiving feedback information providing an assessment by a particular user of a particular program feature from at least one particular comment made by the particular user at a shared forum maintained by a network-accessible computing system for receiving, storing, and presenting comments by forum users, the comments being organized into a plurality of idea categories;
   storing the feedback information in a user feedback profile associated with the particular user in a data store;
   determining a modification to be made to the particular program feature based at least on the user feedback profile, the determining including automatically interpreting the at least one particular comment based at least on a linguistic content of the at least one particular comment, the automatically interpreting including identifying at least one particular idea category associated with the at least one particular comment;
   making the modification to the particular program feature to produce a modified program feature, the making including applying at least one modification rule associated with the at least one particular idea category, the modified program feature producing a modified user experience when the particular user interacts with the modified program feature using a user computing device; and
   notifying the particular user of the modification to the particular program feature,
   wherein the notifying comprises choosing a timing at which to present a notification to the particular user, and/or choosing a method with which to present the notification to the particular user, based at least on one or more notification presentation rules.

2. The method of claim 1, wherein the feedback information is received in a course of interaction by the particular user with the particular program feature.

3. The method of claim 1, wherein the particular program feature pertains to a particular program component, and wherein the feedback information is stored in a section of the user feedback profile that is dedicated to the particular program component.

4. The method of claim 1, further comprising:
   receiving telemetry information that describes one or more aspects of an operation of the particular program feature, as the operation affects the particular user; and
   storing the telemetry information in the user feedback profile, wherein the modification to be made is determined based also on the telemetry information.

5. The method of claim 1, further comprising:
   identifying the at least one modification rule corresponding to keyword information in the at least one particular comment, the at least one modification rule specifying an identified modification to be made to the particular program feature, wherein the making includes making the identified modification.

6. The method of claim 1, wherein the determining a modification to be made includes using at least one machine-trained model to map the at least one particular comment to an indication of the modification to be made, and
   wherein the making entails making the modification associated with the indication.

7. The method of claim 1, further comprising:
   receiving feedback information from a plurality of program users regarding one or more program features;
   identifying at least one user group associated with a same modification to be made to a program feature for a benefit of two or more users in the at least one user group; and
   making, as an integrated batch task, the same modification for the two or more users in the at least one user group.

8. The method of claim 1, wherein the notifying comprises alerting the particular user to the modification to the particular program feature in a context of interaction by the particular user with the particular program feature that has been changed.

9. The method of claim 1, further comprising alerting the particular user to a nexus between the modification to the particular program feature and the feedback information provided by the particular user.

10. The method of claim 1, further comprising receiving post-modification assessment information from the particular user regarding an assessment by the particular user of the modified program feature.

11. The method of claim 10, further comprising:
    determining whether the post-modification assessment information satisfies a user satisfaction threshold value; and
    responsive to a determination that the post-modification assessment information satisfies the user satisfaction threshold value, inviting the particular user to post the assessment of the modified program feature to the shared forum.

12. A system, comprising:
    one or more processing devices; and at least one computer readable storage medium storing computer readable instructions which, when executed by the one or more processing devices, cause the one or more processing devices to:

receive feedback information associated with a user, the feedback information providing an assessment by the user of a particular program feature, the assessment being expressed, at least in part, by at least one comment made by the user at a shared forum for exchanging comments by forum users about program features;

store the feedback information in a user feedback profile associated with the user in a data store;

automatically interpret the at least one comment by the user based at least on a linguistic content of the at least one comment;

determine a modification to be made to the particular program feature based at least on the user feedback profile associated with the user and the linguistic content;

make the modification to the particular program feature to produce a modified program feature by applying at least one modification rule associated with an idea category, the modified program feature producing a modified user experience when the user interacts with the modified program feature;

notify the user of the modification to the particular program feature by:

presenting a notification to the user at a determined time; and/or presenting the notification to the user based at least on one or more notification presentation rules; and receive post-modification assessment information from the user regarding an assessment, by the user, of the modified program feature.

13. The system of claim 12, wherein the computer readable instructions, when executed by the one or more processing devices, cause the one or more processing devices to:

receive telemetry information that describes one or more aspects of an operation of the particular program feature, as the operation affects the user;

store the telemetry information in the user feedback profile; and determine the modification to be made based at least on the linguistic content of the at least one comment and the telemetry information.

14. The system of claim 12, wherein the computer readable instructions, when executed by the one or more processing devices, cause the one or more processing devices to:

identify the at least one modification rule that corresponds to keyword information in the at least one comment, the at least one modification rule specifying an identified modification to be made to the particular program feature.

15. The system of claim 12, wherein the computer readable instructions, when executed by the one or more processing devices, cause the one or more processing devices to: use at least one machine-trained model to map the at least one comment to an indication of the modification to be made.

16. The system of claim 12, wherein the computer readable instructions, when executed by the one or more processing devices, cause the one or more processing devices to:

invite the user to post the post-modification assessment information to the shared forum in response to a determination that the post-modification assessment information satisfies a user satisfaction threshold value.

17. A computer-readable storage medium storing computer-readable instructions which, when executed by one or more processing devices, cause the one or more processing devices to perform acts comprising:

receiving feedback information providing an assessment by a particular user of a particular program feature from at least one particular comment made by the particular user at a shared forum maintained by a network-accessible computing system for receiving, storing, and presenting comments by forum users, the comments being organized into a plurality of idea categories;

storing the feedback information in a user feedback profile associated with the particular user in a data store;

determining a modification to be made to the particular program feature based at least on the user feedback profile, the determining including automatically interpreting the at least one particular comment based at least on a linguistic content of the at least one particular comment, the automatically interpreting including identifying at least one particular idea category associated with the at least one particular comment;

making the modification to the particular program feature to produce a modified program feature, the making including applying at least one modification rule associated with the at least one particular idea category, the modified program feature producing a modified user experience when the particular user interacts with the modified program feature using a user computing device; and notifying the particular user of the modification to the particular program feature, wherein the notifying comprises choosing a timing at which to present a notification to the particular user, and/or choosing a method with which to present the notification to the particular user, based at least on one or more notification presentation rules.

18. The computer-readable storage medium of claim 17, wherein the computer-readable instructions further cause the one or more processing devices to perform:

receiving post-modification assessment information from the user regarding an assessment by the user of the modified program feature; and inviting the user to post a comment indicating the post-modification assessment information upon determining that the post-modification assessment information satisfies a user satisfaction threshold value.

* * * * *